United States Patent [19]
Radhakrishnan et al.

[11] Patent Number: 5,706,288
[45] Date of Patent: Jan. 6, 1998

[54] AVAILABLE BIT RATE SCHEDULER

[75] Inventors: Sivakumar Radhakrishnan, Burnaby; Stephen J. Dabecki, Port Moody; David Walden Wong, Vancouver, all of Canada

[73] Assignee: PMC-Sierra, Inc., Burnaby, Canada

[21] Appl. No.: 622,398

[22] Filed: Mar. 27, 1996

[51] Int. Cl.$^6$ .................................................. H04J 3/22
[52] U.S. Cl. ......................... 370/418; 370/412; 370/391
[58] Field of Search .............................. 370/389, 391, 370/395, 397, 399, 412, 413, 414, 415, 416, 417, 418, 428, 429, 252, 253, 431, 662, 465, 468, 229, 235, 473, 475, 537

[56] References Cited

U.S. PATENT DOCUMENTS

| | | | |
|---|---|---|---|
| 5,278,828 | 1/1994 | Chao | 370/418 |
| 5,299,191 | 3/1994 | Boyer et al. | 370/412 |
| 5,533,020 | 7/1996 | Byrn et al. | 370/412 |
| 5,561,663 | 10/1996 | Klausmeier | 370/412 |
| 5,617,416 | 4/1997 | Damien | 370/391 |

OTHER PUBLICATIONS

Zhang, "VirtualClock: A New Traffic Control Algorithm for Packer Switching Networks", 1990, SIGCOM '90, pp. 19-29.

Primary Examiner—Wellington Chin
Assistant Examiner—Huy D. Vu
Attorney, Agent, or Firm—Oyen Wiggs Green & Mutala

[57] ABSTRACT

An available bit rate scheduling method and apparatus for asynchronous transfer mode communication of a plurality of cells over a network characterized by a system clock frequency f and an allowed cell rate ACR. Each cell belongs to an assigned virtual circuit communication channel which is defined by a set of negotiated traffic parameters. The invention partitions the ACR's of the virtual circuits into a smaller subset of profiles/sub-profiles and conducts a deterministic search to service them. The scheduler incorporates a profile generator for iteratively generating a number p of the profiles by (i) outputting a k*modulo $2^i$th one of the profiles during each kth iteration of the profile generator, where $1 \leq i \leq p$ and $1 \leq k \leq p-1$; (ii) outputting a null profile during each $2^p$th one of the iterations; and, (iii) dispatching the profiles from the profile generator to the profile queue such that a particular profile is dispatched at a time $T=T_0+(1/ACR)*f$, where $T_0$ is the dispatch time of a profile dispatched immediately prior to the particular profile. A profile queue coupled to the profile generator receives and sequentially stores the generated profiles. A virtual circuit processor sequentially receives the profiles from the profile queue and, for each one of the received profiles, dispatches to an output queue all virtual circuits which are characterized by the one received profile.

19 Claims, 45 Drawing Sheets

ABR Scheduler

Procedure Virtual_time_dispatcher(*p_num*)
Input : Profile *p_num*
(1) If (*p_num*) then /* Check for validity of profile *p_num*. i.e *p* is not equal to zero */
(2)     Obtain the availability vector for profile *p_num* from memory
(3)     Check for an available subprofile within *p_num*.
(4)     If a valid subprofile exists then,
(5)         For each valid subprofile *i* in *p_num* do
(6)             Obtain the highest available subprofile. /* Maximum rate subprofile */
(7)             Fetch the Next Cell Time (NCT). from memory of subprofile *i*.
(8)             If (Current_Cell_time >= NCT) then /* A cell is ready to be dispatched */
(9)                 Scan the link-list associated with the selected subprofile and send the subprofile/VC number to profile queue.
                    NCT = NCT + (1/ACR)* *f*
                    /* Calculate new NCT scaled to the system clock */
(10)                Store NCT in the memory reserved for subprofile *i*
(11)            end /* If */
(12)        end /* of For */
(13)        If all valid subprofiles *i* within *p_num* fail the NCT test then
(14)            Send Null pointer to output
(15)        end /* If */
(16)        Current_cell_time=Current_cell_time + Cell_delay  /* Update CCT for a profile visit */
                /* Cell_delay is the time taken to process one subprofile */
(17)    else /* Current slot is empty */
(18)        Send Null pointer to output
(19)        Current_cell_time=Current_cell_time + Cell_delay  /* Update CCT for a profile visit */
(20)    end /* If */
(21) 
(21) else /* *p_num* = 0, empty slot */
(22)    Send Null pointer to output
(23)    Current_cell_time=Current_cell_time + Cell_delay  /* Update Cell_time for a profile visit */
(24) end /* If */
(25) Return

FIG. 6

Procedure Profile_generator()
Input : NCT, Availability vector for all profiles
          stop  /* to halt scheduling operation */
(1)  Initialize NCT to 0 in memory for all profiles/subprofiles
(2)  Repeat forever
(3)      $p\_num$ = Pingpong() . /* Generate a profile $p\_num$ to visit */
(4)      Virtual_time_dispatcher( $p\_num$ )
(5)      Wait on Stop;  /* If Stop is asserted then wait */
(6)  end  /*

FIG. 7

Procedure Virtual_Circuit_Preprocessor()
Input : profile_queue
(1) Initialize lag to 0
(2) For i=1,...,size(profile_queue)¹Step 2
(3)     Scan the first two profiles from the queue, i.e, profile_queue(i) and profile_queue(i+1)
(4)     If profile_queue(i) is empty then
(5)         If profile_queue(i+1) is empty then /* both are null */
(6)             If (lag $\geq$ 1) then
(7)                 lag=lag - 1 /* decrement lag and save 1 time slot */
(8)             else
(9)                 Send a Null pointer to output /* empty slot since lag is 0 */
(10)            end /*If */
(11)        else /* profile_queue(i+1) has an available profile */
(12)            Send profile_queue(i+1) to output /*output second entry since the first one is null */
(13)        end /* If */
(14)    else /* profile_queue(i) is not empty */
(15)        If profile_queue(i+1) is empty then
(16)            Send profile_queue(i) to output /* output first entry since the second is null */
(17)        else /* profile_queue(i) and (i+1) have an available profile */
(18)            Send profile_queue(i) to output followed by
                    profile_queue(i+1) /*output both in succession */
(19)            lag=lag + 1    /* Increment lag variable since we lose 1 cell_time for
(20)                              scheduling two successive profiles*/
(21)        end /* If */
(22)    end /* If */
(23) end /* If */
(24) end  /* for */

---

¹ For the sake of simplicity, we shall assume that the size of the profile queue is <u>even</u>.

FIG. 8

Note: 1.) Slots 1 ad 2 have no VCs attached (subscript 0)

2.) Slot 3 has 4 subprofiles

3.) Slot 4 has 1 subprofiles

Case-Study 1: (over-provisioned)

| Profiles | Desired Rate (DR) | | Available vector | Virtual Rate | Measured Rate (MR) Max=16 | $\lambda = \dfrac{MR}{DR}$ | Bandwidth Utilization BW=15.9966 |
|---|---|---|---|---|---|---|---|
| p | (FP) | (Fixed) | | | | | |
| 1 | $2^4$ | 16 | 1 | 16.0000 | 8.2561 | 51.6007% | 51.6116% |
|   | $1.75 \times 2^3$ | 14 | 0 | | | | |
|   | $1.50 \times 2^3$ | 12 | 0 | | | | |
|   | $1.25 \times 2^3$ | 10 | 0 | | | | |
| 2 | $2^3$ | 8 | 1 | 8.0000 | 4.1281 | 51.6015% | 25.8062% |
|   | $1.75 \times 2^2$ | 7 | 0 | | | | |
|   | $1.50 \times 2^2$ | 6 | 0 | | | | |
|   | $1.25 \times 2^2$ | 5 | 0 | | | | |
| 3 | $2^2$ | 4 | 1 | 4.0000 | 2.0641 | 51.6031% | 12.9035% |
|   | $1.75 \times 2^1$ | 3.5 | 0 | | | | |
|   | $1.50 \times 2^1$ | 3 | 0 | | | | |
|   | $1.25 \times 2^1$ | 2.5 | 0 | | | | |
| 4 | $2^1$ | 2 | 1 | 2.0000 | 1.0321 | 51.6064% | 6.4522% |
|   | $1.75 \times 2^0$ | 1.75 | 0 | | | | |
|   | $1.50 \times 2^0$ | 1.50 | 0 | | | | |
|   | $1.25 \times 2^0$ | 1.25 | 0 | | | | |
| 5 | $2^0$ | 1 | 1 | 1.0000 | 0.5161 | 51.6129% | 3.2265% |
|   | $1.75 \times 2^{-1}$ | 0.875 | 0 | | | | |
|   | $1.50 \times 2^{-1}$ | 0.750 | 0 | | | | |
|   | $1.25 \times 2^{-1}$ | 0.625 | 0 | | | | |

Desired BW = 31                                        Total=100.0000%

FIG. 12A

Case-Study 2: (over-provisioned)

| Profiles | Desired Rate (DR) | | Available vector | Virtual Rate | Measured Rate (MR) Max=16 | $\lambda = \dfrac{MR}{DR}$ | Bandwidth Utilization BW=15.9955 |
|---|---|---|---|---|---|---|---|
| $p$ | (FP) | (Fixed) | | | | | |
| 1 | $2^4$ | 16 | 1 | 16.0000 | 2.6345 | 16.4656% | 16.4702% |
|   | $1.75 \times 2^3$ | 14 | 1 | 13.4675 | 2.2175 | 15.8393% | 13.8633% |
|   | $1.50 \times 2^3$ | 12 | 1 | 11.6364 | 1.9160 | 15.9665% | 11.9783% |
|   | $1.25 \times 2^3$ | 10 | 1 | 9.8456 | 1.6211 | 16.2111% | 10.1348% |
| 2 | $2^3$ | 8 | 1 | 8.0000 | 1.3172 | 16.4655% | 8.2351% |
|   | $1.75 \times 2^2$ | 7 | 1 | 6.9198 | 1.1395 | 16.2779% | 7.1236% |
|   | $1.50 \times 2^2$ | 6 | 1 | 5.9511 | 0.9800 | 16.3327% | 6.1265% |
|   | $1.25 \times 2^2$ | 5 | 1 | 4.9237 | 0.8108 | 16.2166% | 5.0691% |
| 3 | $2^2$ | 4 | 1 | 4.0000 | 0.6586 | 16.4640% | 4.1171% |
|   | $1.75 \times 2^1$ | 3.5 | 1 | 3.4599 | 0.5696 | 16.2752% | 3.5612% |
|   | $1.50 \times 2^1$ | 3 | 1 | 2.9746 | 0.4897 | 16.3243% | 3.0617% |
|   | $1.25 \times 2^1$ | 2.5 | 1 | 2.4863 | 0.4095 | 16.3785% | 2.5599% |
| 4 | $2^1$ | 2 | 1 | 2.0000 | 0.3294 | 16.4675% | 2.0590% |
|   | $1.75 \times 2^0$ | 1.75 | 1 | 1.7412 | 0.2867 | 16.3845% | 1.7926% |
|   | $1.50 \times 2^0$ | 1.50 | 1 | 1.4902 | 0.2454 | 16.3599% | 1.5342% |
|   | $1.25 \times 2^0$ | 1.25 | 1 | 1.2471 | 0.2054 | 16.4288% | 1.2839% |
| 5 | $2^0$ | 1 | 1 | 1.0000 | 0.1647 | 16.4708% | 1.0297% |
|   | $1.75 \times 2^{-1}$ | 0.875 | 0 | | | | |
|   | $1.50 \times 2^{-1}$ | 0.750 | 0 | | | | |
|   | $1.25 \times 2^{-1}$ | 0.625 | 0 | | | | |
|   |   |   |   |   |   |   | Total=100.0000% |

Desired BW = 98.50

FIG. 13A

Case-Study 3: (over_provisioned)

| Profiles | Desired Rate (DR) | | Available vector | Virtual Rate | Measured Rate (MR) Max=16 | $\lambda = \frac{MR}{DR}$ | Bandwidth Utilization BW=15.9969 |
|---|---|---|---|---|---|---|---|
| $p$ | (FP) | (Fixed) | | | | | |
| 1 | $2^4$ | 16 | 0 | | | | |
|  | $1.75 \times 2^3$ | 14 | 0 | | | | |
|  | $1.50 \times 2^3$ | 12 | 1 | 11.6364 | 4.7294 | 39.4120% | 29.5647% |
|  | $1.25 \times 2^3$ | 10 | 1 | 9.4856 | 4.0016 | 40.0159% | 25.0147% |
| 2 | $2^3$ | 8 | 0 | | | | |
|  | $1.75 \times 2^2$ | 7 | 0 | | | | |
|  | $1.50 \times 2^2$ | 6 | 1 | 5.9511 | 2.4188 | 40.3125% | 15.1201% |
|  | $1.25 \times 2^2$ | 5 | 1 | 4.9237 | 2.0020 | 40.0398% | 12.5148% |
| 3 | $2^2$ | 4 | 1 | 4.0000 | 1.6258 | 40.6443% | 10.1630% |
|  | $1.75 \times 2^1$ | 3.5 | 0 | | | | |
|  | $1.50 \times 2^1$ | 3 | 0 | | | | |
|  | $1.25 \times 2^1$ | 2.5 | 0 | | | | |
| 4 | $2^1$ | 2 | 1 | 2.0000 | 0.8127 | 40.6375% | 5.0807% |
|  | $1.75 \times 2^0$ | 1.75 | 0 | | | | |
|  | $1.50 \times 2^0$ | 1.50 | 0 | | | | |
|  | $1.25 \times 2^0$ | 1.25 | 0 | | | | |
| 5 | $2^0$ | 1 | 1 | 1.0000 | 0.4066 | 40.6644% | 2.5420% |
|  | $1.75 \times 2^{-1}$ | 0.875 | 0 | | | | |
|  | $1.50 \times 2^{-1}$ | 0.750 | 0 | | | | |
|  | $1.25 \times 2^{-1}$ | 0.625 | 0 | | | | |

Desired BW = 40                    Total=100.0000%

FIG. 14A

Case-Study 4: (overprovisioned)

| Profiles | | Desired Rate (DR) | | Available vector | Virtual Rate | Measured Rate (MR) Max=16 | $\lambda = \dfrac{MR}{DR}$ | Bandwidth Utilization Total=15.9950 |
|---|---|---|---|---|---|---|---|---|
| $p$ | | (FP) | (Fixed) | | | | | |
| 1 | | $2^4$ | 16 | 0 | | | | |
|  | | $1.75 \times 2^3$ | 14 | 1 | 13.4675 | 4.4081 | 31.4861% | 27.5589% |
|  | | $1.50 \times 2^3$ | 12 | 1 | 11.6364 | 3.8087 | 31.7389% | 23.8116% |
|  | | $1.25 \times 2^3$ | 10 | 1 | 9.8456 | 3.2225 | 32.2252% | 20.1470% |
| 2 | | $2^3$ | 8 | 0 | | | | |
|  | | $1.75 \times 2^2$ | 7 | 0 | | | | |
|  | | $1.50 \times 2^2$ | 6 | 0 | | | | |
|  | | $1.25 \times 2^2$ | 5 | 0 | | | | |
| 3 | | $2^2$ | 4 | 1 | 4.0000 | 1.3090 | 32.7249% | 8.1838% |
|  | | $1.75 \times 2^1$ | 3.5 | 1 | 3.4599 | 1.1322 | 32.3498% | 7.0787% |
|  | | $1.50 \times 2^1$ | 3 | 1 | 2.9746 | 0.9734 | 32.4474% | 6.0858% |
|  | | $1.25 \times 2^1$ | 2.5 | 1 | 2.4863 | 0.8137 | 32.5493% | 5.0874% |
| 4 | | $2^1$ | 2 | 0 | | | | |
|  | | $1.75 \times 2^0$ | 1.75 | 0 | | | | |
|  | | $1.50 \times 2^0$ | 1.50 | 0 | | | | |
|  | | $1.25 \times 2^0$ | 1.25 | 0 | | | | |
| 5 | | $2^0$ | 1 | 1 | 1.0000 | 0.3274 | 32.7372% | 2.0467% |
|  | | $1.75 \times 2^{-1}$ | 0.875 | 0 | | | | |
|  | | $1.50 \times 2^{-1}$ | 0.750 | 0 | | | | |
|  | | $1.25 \times 2^{-1}$ | 0.625 | 0 | | | | |
| | | | | | | | | Total=100.0000% |

Desired BW = 50

FIG. 15A

Case-Study 5: (over-provisioned)

| Profiles | Desired Rate (DR) | | Available vector | Virtual Rate | Measured Rate (MR) Max=16 | $\lambda = \dfrac{MR}{DR}$ | Bandwidth Utilization BW=16.0000 |
|---|---|---|---|---|---|---|---|
| p | (FP) | (Fixed) | | | | | |
| 1 | $2^4$ | 16 | 0 | | | | |
| | $1.75 \times 2^3$ | 14 | 0 | | | | |
| | $1.50 \times 2^3$ | 12 | 1 | 11.6364 | 4.9776 | 41.4802% | 31.1101% |
| | $1.25 \times 2^3$ | 10 | 1 | 9.4856 | 4.2116 | 42.1158% | 26.3223% |
| 2 | $2^3$ | 8 | 1 | 8.0000 | 3.4221 | 42.7765% | 21.3882% |
| | $1.75 \times 2^2$ | 7 | 1 | 6.9198 | 2.9609 | 42.2979% | 18.5053% |
| | $1.50 \times 2^2$ | 6 | 0 | | | | |
| | $1.25 \times 2^2$ | 5 | 0 | | | | |
| 3 | $2^2$ | 4 | 0 | | | | |
| | $1.75 \times 2^1$ | 3.5 | 0 | | | | |
| | $1.50 \times 2^1$ | 3 | 0 | | | | |
| | $1.25 \times 2^1$ | 2.5 | 0 | | | | |
| 4 | $2^1$ | 2 | 0 | | | | |
| | $1.75 \times 2^0$ | 1.75 | 0 | | | | |
| | $1.50 \times 2^0$ | 1.50 | 0 | | | | |
| | $1.25 \times 2^0$ | 1.25 | 0 | | | | |
| 5 | $2^0$ | 1 | 1 | 1.0000 | 0.4279 | 42.7880% | 2.6742% |
| | $1.75 \times 2^{-1}$ | 0.875 | 0 | | | | |
| | $1.50 \times 2^{-1}$ | 0.750 | 0 | | | | |
| | $1.25 \times 2^{-1}$ | 0.625 | 0 | | | | |

Desired BW = 38    Total=100.0000%

FIG. 16A

Case-Study 6 (under-provisioned)

| Profiles | | Desired Rate (DR) | | Available vector | Virtual Rate | Measured Rate (MR) Max=16 | $\lambda = \frac{MR}{DR}$ | Bandwidth Utilization BW=10.8858 |
|---|---|---|---|---|---|---|---|---|
| p | | (FP) | (Fixed) | | | | | |
| 1 | | $2^4$ | 16 | 0 | | | | |
|   | | $1.75 \times 2^3$ | 14 | 0 | | | | |
|   | | $1.50 \times 2^3$ | 12 | 0 | | | | |
|   | | $1.25 \times 2^3$ | 10 | 0 | | | | |
| 2 | | $2^3$ | 8 | 0 | | | | |
|   | | $1.75 \times 2^2$ | 7 | 0 | | | | |
|   | | $1.50 \times 2^2$ | 6 | 0 | | | | |
|   | | $1.25 \times 2^2$ | 5 | 0 | | | | |
| 3 | | $2^2$ | 4 | 1 | 4.0000 | 3.1278 | 78.1943% | 28.7327% |
|   | | $1.75 \times 2^1$ | 3.5 | 1 | 3.4599 | 2.7054 | 77.2981% | 24.8529% |
|   | | $1.50 \times 2^1$ | 3 | 1 | 2.9746 | 2.3259 | 77.5312% | 21.3668% |
|   | | $1.25 \times 2^1$ | 2.5 | 1 | 2.4863 | 1.9448 | 77.7914% | 17.8654% |
| 4 | | $2^1$ | 2 | 0 | | | | |
|   | | $1.75 \times 2^0$ | 1.75 | 0 | | | | |
|   | | $1.50 \times 2^0$ | 1.50 | 0 | | | | |
|   | | $1.25 \times 2^0$ | 1.25 | 0 | | | | |
| 5 | | $2^0$ | 1 | 1 | 1.0000 | 0.7818 | 78.1839% | 7.1822% |
|   | | $1.75 \times 2^{-1}$ | 0.875 | 0 | | | | |
|   | | $1.50 \times 2^{-1}$ | 0.750 | 0 | | | | |
|   | | $1.25 \times 2^{-1}$ | 0.625 | 0 | | | | |

Desired BW = 14                                                         Total=100.0000%

FIG. 17A

Case-Study 7: (under-provisioned)

| Profiles | Desired Rate (DR) | | Available vector | Virtual Rate | Measured Rate (MR) Max=16 | $\lambda = \dfrac{MR}{DR}$ | Bandwidth Utilization Total=6.5592 |
|---|---|---|---|---|---|---|---|
| $p$ | (FP) | (Fixed) | | | | | |
| 1 | $2^4$ | 16 | 0 | | | | |
| | $1.75 \times 2^3$ | 14 | 0 | | | | |
| | $1.50 \times 2^3$ | 12 | 0 | | | | |
| | $1.25 \times 2^3$ | 10 | 0 | | | | |
| 2 | $2^3$ | 8 | 0 | | | | |
| | $1.75 \times 2^2$ | 7 | 0 | | | | |
| | $1.50 \times 2^2$ | 6 | 0 | | | | |
| | $1.25 \times 2^2$ | 5 | 0 | | | | |
| 3 | $2^2$ | 4 | 0 | | | | |
| | $1.75 \times 2^1$ | 3.5 | 0 | | | | |
| | $1.50 \times 2^1$ | 3 | 0 | | | | |
| | $1.25 \times 2^1$ | 2.5 | 0 | | | | |
| 4 | $2^1$ | 2 | 1 | 2.0000 | 1.7541 | 87.7042% | 26.7422% |
| | $1.75 \times 2^0$ | 1.75 | 1 | 1.7412 | 1.5271 | 87.2620% | 23.2815% |
| | $1.50 \times 2^0$ | 1.50 | 1 | 1.4902 | 1.3070 | 87.1310% | 19.9256% |
| | $1.25 \times 2^0$ | 1.25 | 1 | 1.2471 | 1.0937 | 87.4979% | 16.6746% |
| 5 | $2^0$ | 1 | 1 | 1.0000 | 0.8774 | 87.7375% | 13.3762% |
| | $1.75 \times 2^{-1}$ | 0.875 | 0 | | | | |
| | $1.50 \times 2^{-1}$ | 0.750 | 0 | | | | |
| | $1.25 \times 2^{-1}$ | 0.625 | 0 | | | | |

Desired BW = 7.50                                                                        Total=100.0000%

FIG. 18A

Case-Study 8: (under-provisioned)

| Profiles | | Desired Rate (DR) | | Available vector | Virtual Rate | Measured Rate (MR) Max=16 | $\lambda = \dfrac{MR}{DR}$ | Bandwidth Utilization BW=13.1489 |
|---|---|---|---|---|---|---|---|---|
| $p$ | | (FP) | (Fixed) | | | | | |
| 1 | | $2^4$ | 16 | 0 | | | | |
| | | $1.75 \times 2^3$ | 14 | 0 | | | | |
| | | $1.50 \times 2^3$ | 12 | 0 | | | | |
| | | $1.25 \times 2^3$ | 10 | 0 | | | | |
| 2 | | $2^3$ | 8 | 0 | | | | |
| | | $1.75 \times 2^2$ | 7 | 0 | | | | |
| | | $1.50 \times 2^2$ | 6 | 0 | | | | |
| | | $1.25 \times 2^2$ | 5 | 1 | 4.9237 | 4.5049 | 90.0582% | 34.2455% |
| 3 | | $2^2$ | 4 | 0 | | | | |
| | | $1.75 \times 2^1$ | 3.5 | 0 | | | | |
| | | $1.50 \times 2^1$ | 3 | 1 | 2.9746 | 2.7204 | 90.6786% | 20.6889% |
| | | $1.25 \times 2^1$ | 2.5 | 1 | 2.4863 | 2.2755 | 91.0184% | 17.3053% |
| 4 | | $2^1$ | 2 | 0 | | | | |
| | | $1.75 \times 2^0$ | 1.75 | 1 | 1.7412 | 1.5935 | 91.0594% | 12.1192% |
| | | $1.50 \times 2^0$ | 1.50 | 0 | | | | |
| | | $1.25 \times 2^0$ | 1.25 | 1 | 1.2471 | 1.1413 | 91.3055% | 8.6800% |
| 5 | | $2^0$ | 1 | 1 | 1.0000 | 0.9153 | 91.5315% | 6.9612% |
| | | $1.75 \times 2^{-1}$ | 0.875 | 0 | | | | |
| | | $1.50 \times 2^{-1}$ | 0.750 | 0 | | | | |
| | | $1.25 \times 2^{-1}$ | 0.625 | 0 | | | | |

Desired BW = 14.50    Total=100.0000%

FIG. 19A

Case-Study 9: (exact-provisioned)

| Profiles | Desired Rate (DR) | | Available vector | Virtual Rate | Measured Rate (MR) Max=16 | $\lambda = \dfrac{MR}{DR}$ | Bandwidth Utilization BW=16 |
|---|---|---|---|---|---|---|---|
| $p$ | (FP) | (Fixed) | | | | | |
| 1 | $2^4$ | 16 | 1 | 16.0000 | 16 | 100% | 100% |
|   | $1.75 \times 2^3$ | 14 | 0 | | | | |
|   | $1.50 \times 2^3$ | 12 | 0 | | | | |
|   | $1.25 \times 2^3$ | 10 | 0 | | | | |
| 2 | $2^3$ | 8 | 0 | | | | |
|   | $1.75 \times 2^2$ | 7 | 0 | | | | |
|   | $1.50 \times 2^2$ | 6 | 0 | | | | |
|   | $1.25 \times 2^2$ | 5 | 0 | | | | |
| 3 | $2^2$ | 4 | 0 | | | | |
|   | $1.75 \times 2^1$ | 3.5 | 0 | | | | |
|   | $1.50 \times 2^1$ | 3 | 0 | | | | |
|   | $1.25 \times 2^1$ | 2.5 | 0 | | | | |
| 4 | $2^1$ | 2 | 0 | | | | |
|   | $1.75 \times 2^0$ | 1.75 | 0 | | | | |
|   | $1.50 \times 2^0$ | 1.50 | 0 | | | | |
|   | $1.25 \times 2^0$ | 1.25 | 0 | | | | |
| 5 | $2^0$ | 1 | 0 | | | | |
|   | $1.75 \times 2^{-1}$ | 0.875 | 0 | | | | |
|   | $1.50 \times 2^{-1}$ | 0.750 | 0 | | | | |
|   | $1.25 \times 2^{-1}$ | 0.625 | 0 | | | | |

Desired BW = 16    Total=100.0000%

FIG. 20A

Case-Study 1: (over-provisioned)

| Profiles | Desired Rate (DR) | | Available vector | Virtual Rate | Measured Rate (MR) Max=16 | $\lambda = \frac{MR}{DR}$ | Bandwidth Utilization BW=15.9966 |
|---|---|---|---|---|---|---|---|
| $p$ | (FP) | (Fixed) | | | | | |
| 1 | $2^4$ | 16 | 1 | 16.0000 | 8.2561 | 51.6007% | 51.6116% |
|   | $1.75 \times 2^3$ | 14 | 0 | | | | |
|   | $1.50 \times 2^3$ | 12 | 0 | | | | |
|   | $1.25 \times 2^3$ | 10 | 0 | | | | |
| 2 | $2^3$ | 8 | 1 | 8.0000 | 4.1281 | 51.6015% | 25.8062% |
|   | $1.75 \times 2^2$ | 7 | 0 | | | | |
|   | $1.50 \times 2^2$ | 6 | 0 | | | | |
|   | $1.25 \times 2^2$ | 5 | 0 | | | | |
| 3 | $2^2$ | 4 | 1 | 4.0000 | 2.0641 | 51.6031% | 12.9035% |
|   | $1.75 \times 2^1$ | 3.5 | 0 | | | | |
|   | $1.50 \times 2^1$ | 3 | 0 | | | | |
|   | $1.25 \times 2^1$ | 2.5 | 0 | | | | |
| 4 | $2^1$ | 2 | 1 | 2.0000 | 1.0321 | 51.6064% | 6.4522% |
|   | $1.75 \times 2^0$ | 1.75 | 0 | | | | |
|   | $1.50 \times 2^0$ | 1.50 | 0 | | | | |
|   | $1.25 \times 2^0$ | 1.25 | 0 | | | | |
| 5 | $2^0$ | 1 | 1 | 1.0000 | 0.5161 | 51.6129% | 3.2265% |
|   | $1.75 \times 2^{-1}$ | 0.875 | 0 | | | | |
|   | $1.50 \times 2^{-1}$ | 0.750 | 0 | | | | |
|   | $1.25 \times 2^{-1}$ | 0.625 | 0 | | | | |
| Desired BW = 31 | | | | | | | Total=100.0000% |

FIG. 22

Case-Study 2: (over-provisioned)

| Profiles | Desired Rate (DR) | | Available vector | Virtual Rate | Measured Rate (MR) Max=16 | $\lambda = \frac{MR}{DR}$ | Bandwidth Utilization Total=16.9955 |
|---|---|---|---|---|---|---|---|
| $p$ | (FP) | (Fixed) | | | | | |
| 1 | $2^4$ | 16 | 1 | 16.0000 | 2.6345 | 16.4656% | 16.4702% |
|  | $1.75 \times 2^3$ | 14 | 1 | 13.4675 | 2.2175 | 15.8393% | 13.8633% |
|  | $1.50 \times 2^3$ | 12 | 1 | 11.6364 | 1.9160 | 15.9665% | 11.9783% |
|  | $1.25 \times 2^3$ | 10 | 1 | 9.8456 | 1.6211 | 16.2112% | 10.1348% |
| 2 | $2^3$ | 8 | 1 | 8.0000 | 1.3172 | 16.4655% | 8.2351% |
|  | $1.75 \times 2^2$ | 7 | 1 | 6.9198 | 1.1395 | 16.2779% | 7.1236% |
|  | $1.50 \times 2^2$ | 6 | 1 | 5.9511 | 0.9800 | 16.3327% | 6.1265% |
|  | $1.25 \times 2^2$ | 5 | 1 | 4.9237 | 0.8108 | 16.2166% | 5.0691% |
| 3 | $2^2$ | 4 | 1 | 4.0000 | 0.6586 | 16.4640% | 4.1171% |
|  | $1.75 \times 2^1$ | 3.5 | 1 | 3.4599 | 0.5696 | 16.2752% | 3.5612% |
|  | $1.50 \times 2^1$ | 3 | 1 | 2.9746 | 0.4897 | 16.3243% | 3.0617% |
|  | $1.25 \times 2^1$ | 2.5 | 1 | 2.4863 | 0.4095 | 16.3785% | 2.5599% |
| 4 | $2^1$ | 2 | 1 | 2.0000 | 0.3294 | 16.4675% | 2.0590% |
|  | $1.75 \times 2^0$ | 1.75 | 1 | 1.7412 | 0.2867 | 16.3845% | 1.7926% |
|  | $1.50 \times 2^0$ | 1.50 | 1 | 1.4902 | 0.2454 | 16.3599% | 1.5342% |
|  | $1.25 \times 2^0$ | 1.25 | 1 | 1.2471 | 0.2054 | 16.4288% | 1.2839% |
| 5 | $2^0$ | 1 | 1 | 1.0000 | 0.1647 | 16.4708% | 1.0297% |
|  | $1.75 \times 2^{-1}$ | 0.875 | 0 | | | | |
|  | $1.50 \times 2^{-1}$ | 0.750 | 0 | | | | |
|  | $1.25 \times 2^{-1}$ | 0.625 | 0 | | | | |
|  | | | | | | | Total=100.0000% |

Desired BW = 98.5

FIG. 23

Case-Study 3: (over-provisioned)

| Profiles | | Desired Rate (DR) | | Available vector | Virtual Rate | Measured Rate (MR) Max=16 | $\lambda = \dfrac{MR}{DR}$ | Bandwidth Utilization Total=15.9969 |
|---|---|---|---|---|---|---|---|---|
| p | | (FP) | (Fixed) | | | | | |
| 1 | | $2^4$ | 16 | 0 | | | | |
| | | $1.75 \times 2^3$ | 14 | 0 | | | | |
| | | $1.50 \times 2^3$ | 12 | 1 | 11.6364 | 4.7294 | 39.4120% | 29.5647% |
| | | $1.25 \times 2^3$ | 10 | 1 | 9.4856 | 4.0016 | 40.0159% | 25.0147% |
| 2 | | $2^3$ | 8 | 0 | | | | |
| | | $1.75 \times 2^2$ | 7 | 0 | | | | |
| | | $1.50 \times 2^2$ | 6 | 1 | 5.9511 | 2.4188 | 40.3125% | 15.1201% |
| | | $1.25 \times 2^2$ | 5 | 1 | 4.9237 | 2.0020 | 40.0398% | 12.5148% |
| 3 | | $2^2$ | 4 | 1 | 4.0000 | 1.6258 | 40.6443% | 10.1630% |
| | | $1.75 \times 2^1$ | 3.5 | 0 | | | | |
| | | $1.50 \times 2^1$ | 3 | 0 | | | | |
| | | $1.25 \times 2^1$ | 2.5 | 0 | | | | |
| 4 | | $2^1$ | 2 | 1 | 2.0000 | 0.8127 | 40.6375% | 5.0807% |
| | | $1.75 \times 2^0$ | 1.75 | 0 | | | | |
| | | $1.50 \times 2^0$ | 1.50 | 0 | | | | |
| | | $1.25 \times 2^0$ | 1.25 | 0 | | | | |
| 5 | | $2^0$ | 1 | 1 | 1.0000 | 0.4066 | 40.6644 | 2.5420% |
| | | $1.75 \times 2^{-1}$ | 0.875 | 0 | | | | |
| | | $1.50 \times 2^{-1}$ | 0.750 | 0 | | | | |
| | | $1.25 \times 2^{-1}$ | 0.625 | 0 | | | | |
| | | | | | | | | Total=100.0000% |

Desired BW = 40

FIG. 24

Case-Study 4: (overprovisioned)

| Profiles | Desired Rate (DR) | | Available vector | Virtual Rate | Measured Rate (MR) Max=16 | $\lambda = \frac{MR}{DR}$ | Bandwidth Utilization Total=15.9950 |
|---|---|---|---|---|---|---|---|
| $p$ | (FP) | (Fixed) | | | | | |
| 1 | $2^4$ | 16 | 0 | | | | |
| | $1.75 \times 2^3$ | 14 | 1 | 13.4675 | 4.4081 | 31.4861% | 27.5589% |
| | $1.50 \times 2^3$ | 12 | 1 | 11.6364 | 3.8087 | 31.7389% | 23.8116% |
| | $1.25 \times 2^3$ | 10 | 1 | 9.8456 | 3.2225 | 32.2252% | 20.1470% |
| 2 | $2^3$ | 8 | 0 | | | | |
| | $1.75 \times 2^2$ | 7 | 0 | | | | |
| | $1.50 \times 2^2$ | 6 | 0 | | | | |
| | $1.25 \times 2^2$ | 5 | 0 | | | | |
| 3 | $2^2$ | 4 | 1 | 4.0000 | 1.3090 | 32.7249% | 8.1838% |
| | $1.75 \times 2^1$ | 3.5 | 1 | 3.4599 | 1.1322 | 32.3498% | 7.0787% |
| | $1.50 \times 2^1$ | 3 | 1 | 2.9746 | 0.9734 | 32.4474% | 6.0858% |
| | $1.25 \times 2^1$ | 2.5 | 1 | 2.4863 | 0.8137 | 32.5493% | 5.0874% |
| 4 | $2^1$ | 2 | 0 | | | | |
| | $1.75 \times 2^0$ | 1.75 | 0 | | | | |
| | $1.50 \times 2^0$ | 1.50 | 0 | | | | |
| | $1.25 \times 2^0$ | 1.25 | 0 | | | | |
| 5 | $2^0$ | 1 | 1 | 1.0000 | 0.3274 | 32.7372% | 2.0467% |
| | $1.75 \times 2^{-1}$ | 0.875 | 0 | | | | |
| | $1.50 \times 2^{-1}$ | 0.750 | 0 | | | | |
| | $1.25 \times 2^{-1}$ | 0.625 | 0 | | | | |
| | | | | | | | Total=100.0000% |

Desired BW = 50

FIG. 25

Case-Study 5: (over-provisioned)

| Profiles | Desired Rate (DR) | | Available vector | Virtual Rate | Measured Rate (MR) Max=16 | $\lambda = \dfrac{MR}{DR}$ | Bandwidth Utilization Total=16.0000 |
|---|---|---|---|---|---|---|---|
| $p$ | (FP) | (Fixed) | | | | | |
| 1 | $2^4$ | 16 | 0 | | | | |
| | $1.75 \times 2^3$ | 14 | 0 | | | | |
| | $1.50 \times 2^3$ | 12 | 1 | 11.6364 | 4.9776 | 41.4802% | 31.1101% |
| | $1.25 \times 2^3$ | 10 | 1 | 9.4856 | 4.2116 | 42.1158% | 26.3223% |
| 2 | $2^3$ | 8 | 1 | 8.0000 | 3.4221 | 42.7765% | 21.3882% |
| | $1.75 \times 2^2$ | 7 | 1 | 6.9198 | 2.9609 | 42.2979% | 18.5053% |
| | $1.50 \times 2^2$ | 6 | 0 | | | | |
| | $1.25 \times 2^2$ | 5 | 0 | | | | |
| 3 | $2^2$ | 4 | 0 | | | | |
| | $1.75 \times 2^1$ | 3.5 | 0 | | | | |
| | $1.50 \times 2^1$ | 3 | 0 | | | | |
| | $1.25 \times 2^1$ | 2.5 | 0 | | | | |
| 4 | $2^1$ | 2 | 0 | | | | |
| | $1.75 \times 2^0$ | 1.75 | 0 | | | | |
| | $1.50 \times 2^0$ | 1.50 | 0 | | | | |
| | $1.25 \times 2^0$ | 1.25 | 0 | | | | |
| 5 | $2^0$ | 1 | 1 | 1.0000 | 0.4279 | 42.7880% | 2.6742% |
| | $1.75 \times 2^{-1}$ | 0.875 | 0 | | | | |
| | $1.50 \times 2^{-1}$ | 0.750 | 0 | | | | |
| | $1.25 \times 2^{-1}$ | 0.625 | 0 | | | | |

Desired BW = 38     Total=100.0000%

FIG. 26

Case-Study 6 (under-provisioned)

| Profiles p | Desired Rate (DR) (FP) | (Fixed) | Available vector | Virtual Rate | Measured Rate (MR) Max=16 | $\lambda = \frac{MR}{DR}$ | Bandwidth Utilization Total=13.9202 |
|---|---|---|---|---|---|---|---|
| 1 | $2^4$ | 16 | 0 | | | | |
|  | $1.75 \times 2^3$ | 14 | 0 | | | | |
|  | $1.50 \times 2^3$ | 12 | 0 | | | | |
|  | $1.25 \times 2^3$ | 10 | 0 | | | | |
| 2 | $2^3$ | 8 | 0 | | | | |
|  | $1.75 \times 2^2$ | 7 | 0 | | | | |
|  | $1.50 \times 2^2$ | 6 | 0 | | | | |
|  | $1.25 \times 2^2$ | 5 | 0 | | | | |
| 3 | $2^2$ | 4 | 1 | 4.0000 | 4.0000 | 100% | 28.7352% |
|  | $1.75 \times 2^1$ | 3.5 | 1 | 3.4599 | 3.4599 | 98.8538% | 24.8551% |
|  | $1.50 \times 2^1$ | 3 | 1 | 2.9746 | 2.9746 | 99.1520% | 21.3686% |
|  | $1.25 \times 2^1$ | 2.5 | 1 | 2.4863 | 2.4869 | 99.4510% | 17.8609% |
| 4 | $2^1$ | 2 | 0 | | | | |
|  | $1.75 \times 2^0$ | 1.75 | 0 | | | | |
|  | $1.50 \times 2^0$ | 1.50 | 0 | | | | |
|  | $1.25 \times 2^0$ | 1.25 | 0 | | | | |
| 5 | $2^0$ | 1 | 1 | 0.9995 | 1.0000 | 99.9508% | 7.1803% |
|  | $1.75 \times 2^{-1}$ | 0.875 | 0 | | | | |
|  | $1.50 \times 2^{-1}$ | 0.750 | 0 | | | | |
|  | $1.25 \times 2^{-1}$ | 0.625 | 0 | | | | |

Desired BW = 14                          Total=100.0000%

FIG. 27

Case-Study 7: (under-provisioned)

| Profiles | Desired Rate (DR) | | Available vector | Virtual Rate | Measured Rate (MR) Max=16 | $\lambda = \dfrac{MR}{DR}$ | Bandwidth Utilization Total=7.4784 |
|---|---|---|---|---|---|---|---|
| p | (FP) | (Fixed) | | | | | |
| 1 | $2^4$ | 16 | 0 | | | | |
|   | $1.75 \times 2^3$ | 14 | 0 | | | | |
|   | $1.50 \times 2^3$ | 12 | 0 | | | | |
|   | $1.25 \times 2^3$ | 10 | 0 | | | | |
| 2 | $2^3$ | 8 | 0 | | | | |
|   | $1.75 \times 2^2$ | 7 | 0 | | | | |
|   | $1.50 \times 2^2$ | 6 | 0 | | | | |
|   | $1.25 \times 2^2$ | 5 | 0 | | | | |
| 3 | $2^2$ | 4 | 0 | | | | |
|   | $1.75 \times 2^1$ | 3.5 | 0 | | | | |
|   | $1.50 \times 2^1$ | 3 | 0 | | | | |
|   | $1.25 \times 2^1$ | 2.5 | 0 | | | | |
| 4 | $2^1$ | 2 | 1 | 2.0000 | 2.0000 | 100% | 26.7436% |
|   | $1.75 \times 2^0$ | 1.75 | 1 | 1.7412 | 1.7412 | 99.4958% | 23.2826% |
|   | $1.50 \times 2^0$ | 1.50 | 1 | 1.4902 | 1.4902 | 99.3464% | 19.9266% |
|   | $1.25 \times 2^0$ | 1.25 | 1 | 1.2471 | 1.2471 | 99.7647% | 16.6754% |
| 5 | $2^0$ | 1 | 1 | 1.0000 | 1.0000 | 100% | 13.3718% |
|   | $1.75 \times 2^{-1}$ | 0.875 | 0 | | | | |
|   | $1.50 \times 2^{-1}$ | 0.750 | 0 | | | | |
|   | $1.25 \times 2^{-1}$ | 0.625 | 0 | | | | |
| | Desired BW = 7.5 | | | | | | Total=100.0000% |

Case-Study 8: (under-provisioned)

| Profiles | Desired Rate (DR) | | Available vector | Virtual Rate | Measured Rate (MR) Max=16 | $\lambda = \dfrac{MR}{DR}$ | Bandwidth Utilization Total=14.3701 |
|---|---|---|---|---|---|---|---|
| $p$ | (FP) | (Fixed) | | | | | |
| 1 | $2^4$ | 16 | 0 | | | | |
|   | $1.75 \times 2^3$ | 14 | 0 | | | | |
|   | $1.50 \times 2^3$ | 12 | 0 | | | | |
|   | $1.25 \times 2^3$ | 10 | 0 | | | | |
| 2 | $2^3$ | 8 | 0 | | | | |
|   | $1.75 \times 2^2$ | 7 | 0 | | | | |
|   | $1.50 \times 2^2$ | 6 | 0 | | | | |
|   | $1.25 \times 2^2$ | 5 | 1 | 4.9213 | 4.9237 | 98.4254% | 34.2466% |
| 3 | $2^2$ | 4 | 0 | | | | |
|   | $1.75 \times 2^1$ | 3.5 | 0 | | | | |
|   | $1.50 \times 2^1$ | 3 | 1 | 2.9731 | 2.9746 | 99.1035% | 20.6895% |
|   | $1.25 \times 2^1$ | 2.5 | 1 | 2.4875 | 2.4863 | 99.4998% | 17.3102% |
| 4 | $2^1$ | 2 | 0 | | | | |
|   | $1.75 \times 2^0$ | 1.75 | 1 | 1.7412 | 1.7412 | 99.4958% | 12.1167% |
|   | $1.50 \times 2^0$ | 1.50 | 0 | | | | |
|   | $1.25 \times 2^0$ | 1.25 | 1 | 1.2471 | 1.2471 | 99.7647% | 8.6781% |
| 5 | $2^0$ | 1 | 1 | 1.0000 | 1.0000 | 100% | 6.9589% |
|   | $1.75 \times 2^{-1}$ | 0.875 | 0 | | | | |
|   | $1.50 \times 2^{-1}$ | 0.750 | 0 | | | | |
|   | $1.25 \times 2^{-1}$ | 0.625 | 0 | | | | |

Desired BW = 14.50  Total=100.0000%

FIG. 30

Case-Study 9: (exact-provisioned)

| Profiles | | Desired Rate (DR) | | Available vector | Virtual Rate | Measured Rate (MR) Max=16 | $\lambda = \dfrac{MR}{DR}$ | Bandwidth Utilization Total=16 |
|---|---|---|---|---|---|---|---|---|
| $p$ | | (FP) | (Fixed) | | | | | |
| 1 | | $2^4$ | 16 | 1 | 16.0000 | 16 | 100% | 100% |
| | | $1.75 \times 2^3$ | 14 | 0 | | | | |
| | | $1.50 \times 2^3$ | 12 | 0 | | | | |
| | | $1.25 \times 2^3$ | 10 | 0 | | | | |
| 2 | | $2^3$ | 8 | 0 | | | | |
| | | $1.75 \times 2^2$ | 7 | 0 | | | | |
| | | $1.50 \times 2^2$ | 6 | 0 | | | | |
| | | $1.25 \times 2^2$ | 5 | 0 | | | | |
| 3 | | $2^2$ | 4 | 0 | | | | |
| | | $1.75 \times 2^1$ | 3.5 | 0 | | | | |
| | | $1.50 \times 2^1$ | 3 | 0 | | | | |
| | | $1.25 \times 2^1$ | 2.5 | 0 | | | | |
| 4 | | $2^1$ | 2 | 0 | | | | |
| | | $1.75 \times 2^0$ | 1.75 | 0 | | | | |
| | | $1.50 \times 2^0$ | 1.50 | 0 | | | | |
| | | $1.25 \times 2^0$ | 1.25 | 0 | | | | |
| 5 | | $2^0$ | 1 | 0 | | | | |
| | | $1.75 \times 2^{-1}$ | 0.875 | 0 | | | | |
| | | $1.50 \times 2^{-1}$ | 0.750 | 0 | | | | |
| | | $1.25 \times 2^{-1}$ | 0.625 | 0 | | | | |

Desired BW = 16     Total=100.0000%

Case-Study 10 (over-provisioned)

| Profiles | Link List | | Desired Rate (DR) | Measured Rate (MR) Max=16 | $\lambda = \dfrac{MR}{DR}$ | Bandwidth Utilization Total=16 |
|---|---|---|---|---|---|---|
| p | Subprofile | VC No. | | | | |
| 1 | 1 | 1 | 16 | 3.953168 | 24.707302% | 24.708523% |
| | | 2 | 16 | 3.953168 | 24.707302% | 24.708523% |
| 2 | 1 | 1 | 7 | 1.709451 | 24.420732% | 10.684599% |
| | | 2 | 7 | 1.709451 | 24.420732% | 10.684599% |
| | | 3 | 7 | 1.709451 | 24.420732% | 10.684599% |
| 3 | 1 | 1 | 4 | 0.988156 | 24.703892% | 6.176278% |
| | | 2 | 4 | 0.988156 | 24.703892% | 6.176278% |
| 5 | 1 | 1 | 1 | 0.247052 | 24.705168% | 1.544149% |
| | | 2 | 1 | 0.247052 | 24.705168% | 1.544149% |
| | | 3 | 1 | 0.247052 | 24.705168% | 1.544149% |
| | | 4 | 1 | 0.247052 | 24.705168% | 1.544149% |
| Desired BW = 65 | | | | | | Total=100.0000% |

FIG. 31A

Case-Study 11 (under-provisioned)

| Profiles | Link List | | Desired Rate (DR) | Measured Rate (MR) Max=16 | $\lambda = \dfrac{MR}{DR}$ | Bandwidth Utilization Total=13.17078 |
|---|---|---|---|---|---|---|
| $p$ | Subprofile | VC No. | | | | |
| 3 | 3 | 1 | 3 | 2.980929 | 99.364304% | 22.632906% |
|  |  | 2 | 3 | 2.980929 | 99.364304% | 22.632906% |
|  |  | 3 | 3 | 2.980929 | 99.364304% | 22.632906% |
|  |  | 4 | 3 | 2.980929 | 99.364304% | 22.632906% |
| 4 | 4 | 1 | 1.25 | 1.247059 | 99.764709% | 9.468378% |

Desired BW = 13.50                    Total=100.0000%

FIG. 31B

```
Procedure Virtual_time_dispatcher( p )
Input : Profile p_num
(1)  If ( p_num ) then          /* Check for validity of profile p_num. i.e  p_num is not equal to zero */
(2)      Obtain the availability vector for profile p_num from memory
(3)      Check for an available subprofile within p_num.
(4)      If a valid subprofile exists then,
(5)          For each valid subprofile i in p_num do
(6)              Obtain the highest available subprofile. /* Maximum rate subprofile */
(7)              Fetch the Next Cell Time (NCT). from memory of subprofile i.
(8)              Fetch NCT_overflow_bit and cycle_bit from memory of subprofile i.
(9)              Obtain CCT_global_overflow_bit.
(10)             if (CCT_global_overflow_bit == NCT_overflow_bit),
(11)                 ct = CCT % total_current_cell_time;   /* Normal operation */
(12)                 nt = NCT % total_current_cell_time;
(13)             else if (CCT_global_overflow_bit == cycle_bit) /* Check if current_cell_time has crossed
(14)                             over since last NCT update */
(15)                 ct = CCT % total_current_cell_time;  /* Update NCT */
(16)                 nt = NCT % total_current_cell_time + total_current_cell_time;
(17)             else
(18)                 ct = (CCT % total_current_cell_time) + total_current_cell_time;  /* Update CCT only */
(19)                 nt = NCT % total_current_cell_time;
(20)             end
(21)             If (ct >= nt) then  /* A cell is ready to be dispatched  since NCT check passes*/
(22)                 Send subprofile number to profile queue
(23)                 NCT = (nt + (1/ACR)* f )%total_current_cell_time
(24)                         /* Calculate new NCT scaled to the system clock */
(25)                 if ((nt + (1/ACR)* f )>= total_current_cell_time),
(26)                     Initialize nct_overflow_bit = ~ nct_overflow_bit  /*Toggle */
(27)                             and store it in memory of subprofile i
                 end
```

FIG. 33A

```
(28)         Store NCT in the memory reserved for subprofile i
(29)         Set cycle_bit equal to CCT_global_overflow_bit and store in memory of
                     subprofile i
(30)       end /* If */
(31)    end /* of For */
(32)    If all valid subprofiles i within p_num fail the NCT test then
(33)       Send Null pointer to output
(34)    end /* If */
(35)    if ((current_cell_time + cell_delay) >= total_current_cell_time),
(36)       CCT_global_overflow_bit = ~CCT_global_overflow_bit;
(37)                                       /* Toggle CCT_global_overflow_flag
                                               to indicate a boundary is reached */
(38)    end
(39)    CCT=(CCT + Cell_delay) %total_current_cell_time
(40)                                       /* Update Cell_time for a profile visit */
(41)                                       /* Cell_delay is the time taken to process one subprofile */
(42)  else /* Current slot is empty */
(43)     Send Null pointer to output
(44)     if ((CCT + cell_delay) >= total_current_cell_time),
(45)        CCT_global_overflow_bit = ~CCT_global_overflow_bit;
(46)                                       /* boundary is reached */
(47)     end
(48)     CCT=(CCT + Cell_delay) % total_current_cell_time
(49)   end /* If */
(50) else /* p_num = 0, empty slot */
(51)    Send Null pointer to output
(52)    if ((CCT + cell_delay) >= total_current_cell_time),
(53)       CCT_global_overflow_bit = ~CCT_global_overflow_bit;
(54)                                       /* boundary is reached */
(55)    end
(56)    CCT=(CCT + Cell_delay) %total_current_cell_time
(57) end /* If */
     Return
```

FIG. 33B

Procedure Profile_generator()
Input : NCT, stop
(1) Initialize NCT to 0 in memory for all profiles/subprofiles
(2) Initialize CCT_global_overflow_bit and NCT_overflow_bit to 0 in memory for all subprofiles
(3) Set total_current_cell_time = $2^{fe}$;
(4) Repeat
(5)     p_num = Pingpong() . /* Generate a profile p_num to visit */
(6)     Virtual_time_dispatcher(p_num)
(7) Until stop /*

AVAILABLE BIT RATE SCHEDULER

FIELD OF THE INVENTION

This application pertains to an available bit rate (ABR) scheduler for use in asynchronous transfer mode (ATM) communications.

BACKGROUND OF THE INVENTION

ATM is a networking protocol which supports a variety of applications having distinct bandwidth requirements and distinct tolerances for delay, jitter, cell loss, etc. ATM networks provide different "service classes" at different prices which reflect the differing quality of service (QoS) provided by each class. The QoS can define minimum levels of available bandwidth, and place bounds on parameters such as cell loss and delay. The user informs the network, upon connection set-up, of the expected nature of the traffic to be sent by the user along the connection, and of the QoS required for such connection.

The available bit rate (ABR) service class supports variable rate data transmissions without preserving timing relationships between source and destination. ABR users are provided guaranteed service with respect to cell loss, and "fair" access to available bandwidth as determined by pre-defined fairness criteria. The user receives only the network's best attempt to maximize the user's available bandwidth or allowed cell rate (ACR), through the use of feedback flow control mechanisms. Such mechanisms facilitate control over the amount of traffic allowed into the network, and hence minimization of cell loss due to congestion. A traffic shaping algorithm, controlling the ACR, is used at the source to control the traffic rate into the network, based upon a congestion indicator in the received cells.

A pre-defined set of traffic parameters characterize the traffic sent over an ATM connection. Parameters such as minimum cell rate (MCR), peak cell rate (PCR), cell delay variation tolerance (CDVT), sustainable cell rate (SCR) and burst tolerance (BT) characterize the traffic stream in general, although not all parameters are meaningful for all service classes. For example, in ABR service, the PCR determines the maximum value of the ACR, which is dynamically controlled by the ATM network, using congestion control mechanisms, to vary between the MCR and PCR.

When setting up a connection, the requesting node informs the network of the required service class, the traffic parameters of the data to be passed in each direction along the connection, and the QoS requested for each direction. Establishment of an ATM connection having specified traffic descriptors constitutes a traffic "contract" between the user and the network. The network offers a QoS guarantee appropriate to the service class requested by the user. In return, the user must confine traffic sent over the connection in compliance with the attributes of the traffic contract for the requested service class. ATM network switches police the user's traffic via algorithms which determine whether the cell stream is compliant with the traffic contract.

An ABR scheduler is an essential and integral part of any ATM implementation offering ABR service. Its purpose is to determine when cells are ready to be transmitted in a fair and efficient manner. In this context, "fairness" means that all service classes should be given an equal opportunity; "efficiency" means that cells should be transmitted at or near their specified rates. The present invention implements an ABR scheduler having the necessary attributes of fairness and efficiency.

SUMMARY OF THE INVENTION

In accordance with the preferred embodiment, the invention provides an available bit rate scheduling method and apparatus for asynchronous transfer mode communication of a plurality of cells over a network characterized by a system clock frequency f and an allowed cell rate ACR. Each cell belongs to an assigned virtual circuit communication channel which is defined by a set of negotiated traffic parameters. The invention partitions the ACR's of the virtual circuits into a smaller subset of profiles/sub-profiles and conducts a deterministic search to service them. The scheduler incorporates a profile generator for iteratively generating a number p of the profiles by (i) outputting a $k*$modulo $2^i$th one of the profiles during each kth iteration of the profile generator, where $1 \leq i \leq p$ and $1 \leq k \leq p-1$; (ii) outputting a null profile during each $2^p$th one of the iterations; and, (iii) dispatching the profiles from the profile generator to the profile queue such that a particular profile is dispatched at a time $T=T_0+(1/ACR)*f$, where $T_0$ is the dispatch time of a profile dispatched immediately prior to the particular profile. A profile queue coupled to the profile generator receives and sequentially stores the generated profiles. A virtual circuit processor sequentially receives the profiles from the profile queue and, for each one of the received profiles, dispatches to an output queue all virtual circuits which are characterized by the one received profile.

BRIEF DESCRIPTION OF THE DRAWINGS

FIG. 6 is a pseudo-code listing representative of an algorithm for implementing the virtual time dispatcher component of the FIG. 2 profile generator.

FIG. 7 is a pseudo-code listing representative of an algorithm for implementing a profile generator in accordance with FIG. 2.

FIG. 8 is a pseudo-code listing representative of a virtual circuit preprocessor algorithm for translating a profile queue to a slower sampling rate.

FIGS. 12(a)–20(a) and 12(b)–20(b) are respectively tabular and graphical depictions of nine case studies of a sequential scheduling implementation of the invention.

FIGS. 22–30 are tabular depictions of nine case studies (corresponding to the FIGS. 12–20 case studies) of a parallel scheduling implementation of the invention.

FIGS. 31(a) and 31(b) are tabular depictions of additional case studies extended to include multiple virtual circuits.

FIGS. 33(a), 33(b) and 34 are pseudo-code listings similar to those of FIGS. 6 and 7 respectively, but incorporate modifications for dealing with the counter overflow problem illustrated in FIG. 32.

DETAILED DESCRIPTION OF THE PREFERRED EMBODIMENT

Introduction

Figure 1:
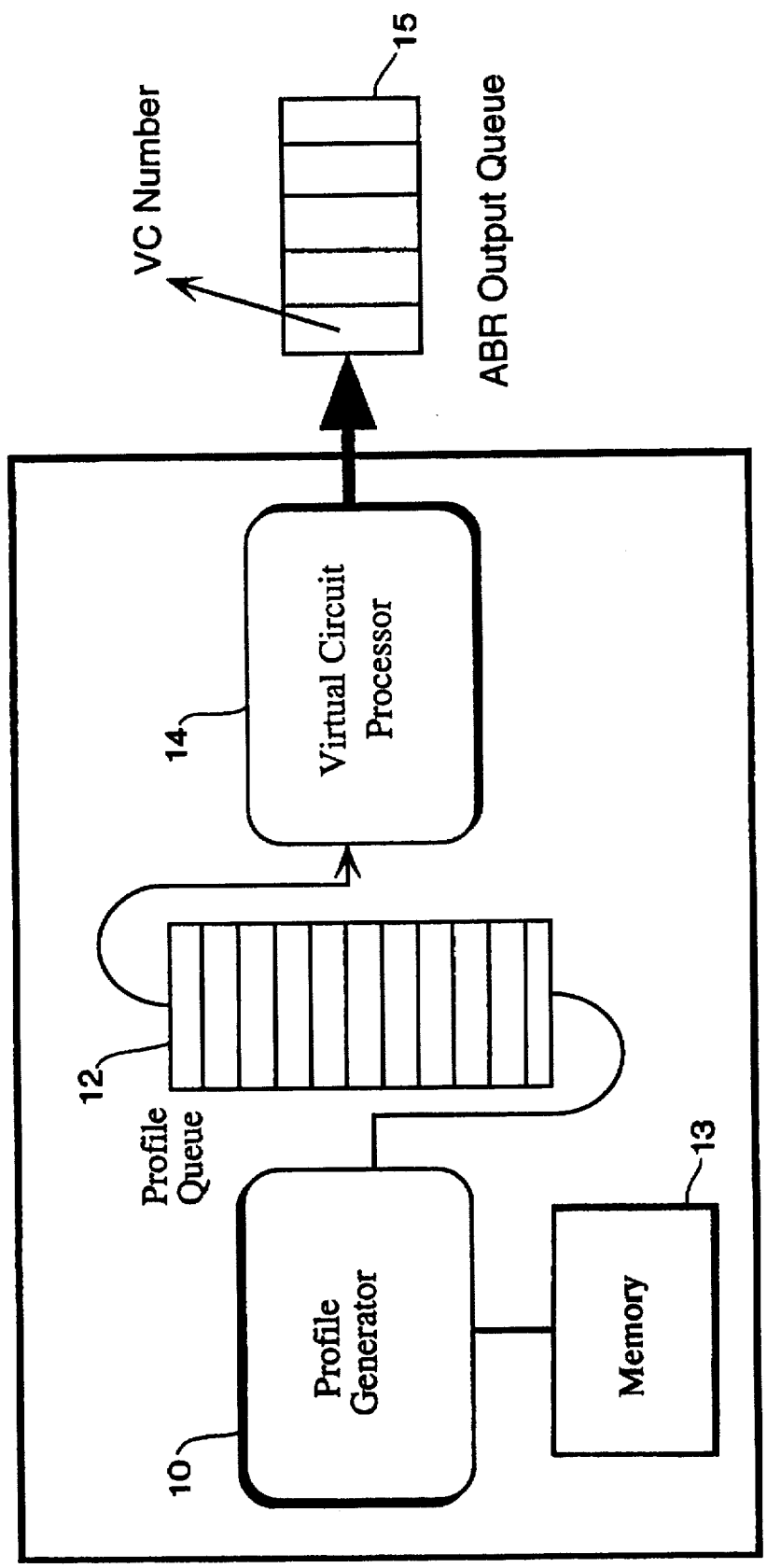
FIG. 1 is a block diagram of an Available Bit Rate scheduler in accordance with the invention.

In an ATM network, a communication channel may be characterized by a virtual circuit (VC) defined by preselected traffic and QoS parameters. The problem, in providing ABR service, is to efficiently manage transmission of cells pertaining to different VCs. The allowed cell rate (ACR) at which a cell belonging to a given VC is transmitted varies between the minimum cell rate (MCR) and the peak cell rate (PCR) which are negotiated when the VC is established. The ACR is a floating point number as defined in the ATM Forum specifications, and expressed as $$ACR = \left(1 + \frac{m}{512}\right) 2^e \quad (1)$$

where $0 \leq e \leq 31$ and $0 \leq m \leq 511$. As can be seen, ACR covers a wide dynamic range between 1 cell/sec to 32 Gigacells/sec.

In order to permit efficient scheduling of VCs in an ABR service, the present invention introduces a classification scheme in which VCs are indexed according to their exponents and mantissa to form groups of "profiles" and "subprofiles". More particularly, a profile i, $1 \leq i \leq p$ is a collection of VCs whose ACRs fall within a closed range:

$$\left[1 \cdot \bar{x} \times 2^{p-i}, \ldots, \left(1 + \frac{1}{sp}\right) \times 2^{p-i+1}\right] \quad (2)$$

where p is the number of profiles, sp is the number of subprofiles, and $0 \leq \bar{x} < 1/sp$ such that the effective profile rate is then given by $2^{p-i}$. A subprofile j, $1 \leq j \leq sp$ is a subset of VCs belonging to profile i, $1 \leq i \leq p$ such that their ACRs default to the nearest and smaller rate given by:

$$\left(1 + \frac{(sp-j+1)}{sp}\right) \times 2^{p-i+1} \quad (3)$$

For example, if p=sp=4 then the subprofile rates conforming to the above definition are summarized in Table 1.

TABLE 1

| Profile | Subprofile rates (cells/second) | | | |
|---|---|---|---|---|
| | 1 | 2 | 3 | 4 |
| 1 | 8 | 7 | 6 | 5 |
| 2 | 4 | 3.5 | 3 | 2.5 |
| 3 | 2 | 1.75 | 1.50 | 1.25 |
| 4 | 1 | 0.875 | 0.750 | 0.625 |

Note that rates of subprofile 1 in each of the 4 profiles are identical to the profile rates of 8, 4, 2 and 1 respectively. It can be seen that the larger the number of subprofiles, the finer is the granularity and therefore the VCs will be scheduled closer to their ACRs, consequently increasing hardware and computational requirements.

Whenever a VC is provisioned (i.e. allocated), the ACR of the corresponding VC is uniquely mapped to one of the closest and smallest profile/subprofile rates. The smaller rate is chosen since otherwise the negotiated traffic contract may be violated by scheduling a cell a rate faster than ACR.

By quantizing VCs based on the exponent values of their rates, a fast deterministic search can be performed to service the profiles. A linear search on the subprofiles is then conducted and, using a virtual time algorithm wherein the next cell time is calculated based on its ACR, the system clock frequency and the number of profiles, it can be uniquely determined whether the chosen VCs are ready for transmission by comparing with the current cell time.

The ABR scheduler of the present invention also maintains a table (in memory) in which VCs are stored along with negotiated traffic contract parameters such as PCR, MCR, etc. A linked list of VCs is attached to each profile/subprofile. When a particular profile/subprofile is ready to be transmitted (as determined by the scheduler algorithm summarized above), the entire list linked to that profile/subprofile is serviced and the ATM cells are placed in the ABR output queue for transmission.

The scheduler also interacts with an ABR contract module which implements source/destination behaviour functions in accordance with ATM Forum-defined congestion management protocols and links/delinks the VCs to the various profiles/subprofiles in the table dynamically, depending on its state. For example, if congestion is detected in the network, then the ACR for a particular VC is reduced by a predetermined amount and accordingly the VC's link to a profile/subprofile needs to be updated.

Profile Generator

FIG. 1 depicts an available bit rate scheduler in block diagram form. The three principal functional components of the scheduler are profile generator 10, profile queue 12 and virtual circuit processor 14. Memory 13 stores updated values of each VC's next cell time (NCT) together with information pertaining to the provisioning/unprovisioning status of each VC and other ABR service scheduling parameters. Profile generator 10 outputs a sequence of profiles and subprofiles to be serviced, based on a deterministic pattern conforming to a performance metric which represents predefined criteria of fairness and efficiency. Profiles and subprofiles output by profile generator 10 are stored in profile queue 12, which is a first-in-first-out (FIFO) buffer. Virtual circuit processor 14 ensures that all VCs attached to a particular profile (as a link list) are dispatched to ABR output queue 15 for transmission.

Figure 2:
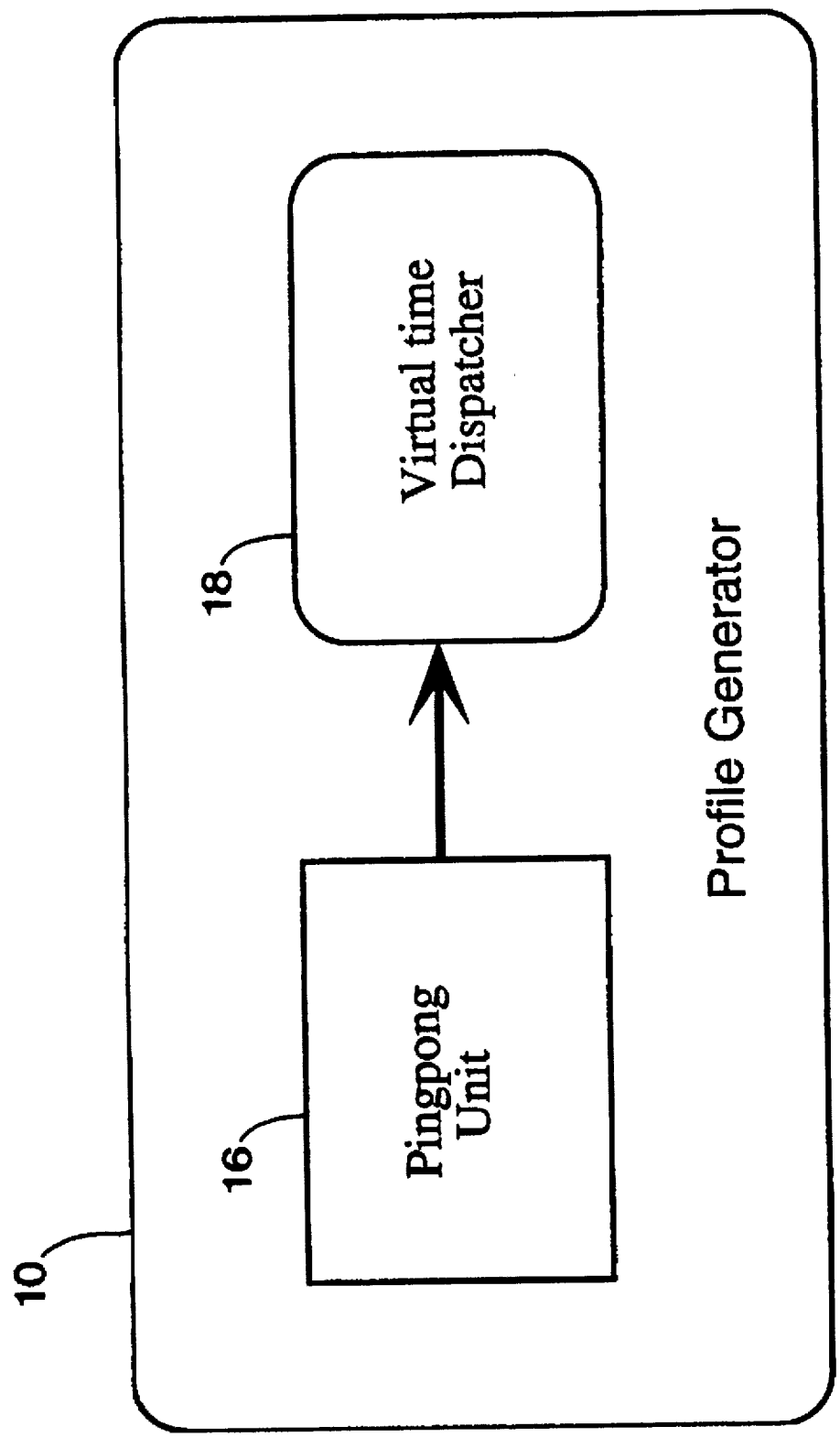
FIG. 2 is a block diagram depiction of the profile generator component of the FIG. 1 scheduler.

As shown in FIG. 2, profile generator 10 has two principal functional components, namely "ping-pong" unit 16 and virtual time dispatcher 18. As explained below, ping-pong unit 16 employs a so-called "ping-pong" algorithm to produce a profile trace which is utilized by virtual time dispatcher 18 to determine whether the particular profile is ready to be sent to profile queue 12. Virtual time dispatcher 18 is conceptually analogous to a virtual clock, in that decisions are effected by comparing the current cell time (CCT) to the next cell time (NCT), as hereinafter explained.

Ping-Pong Algorithm

Figure 3:
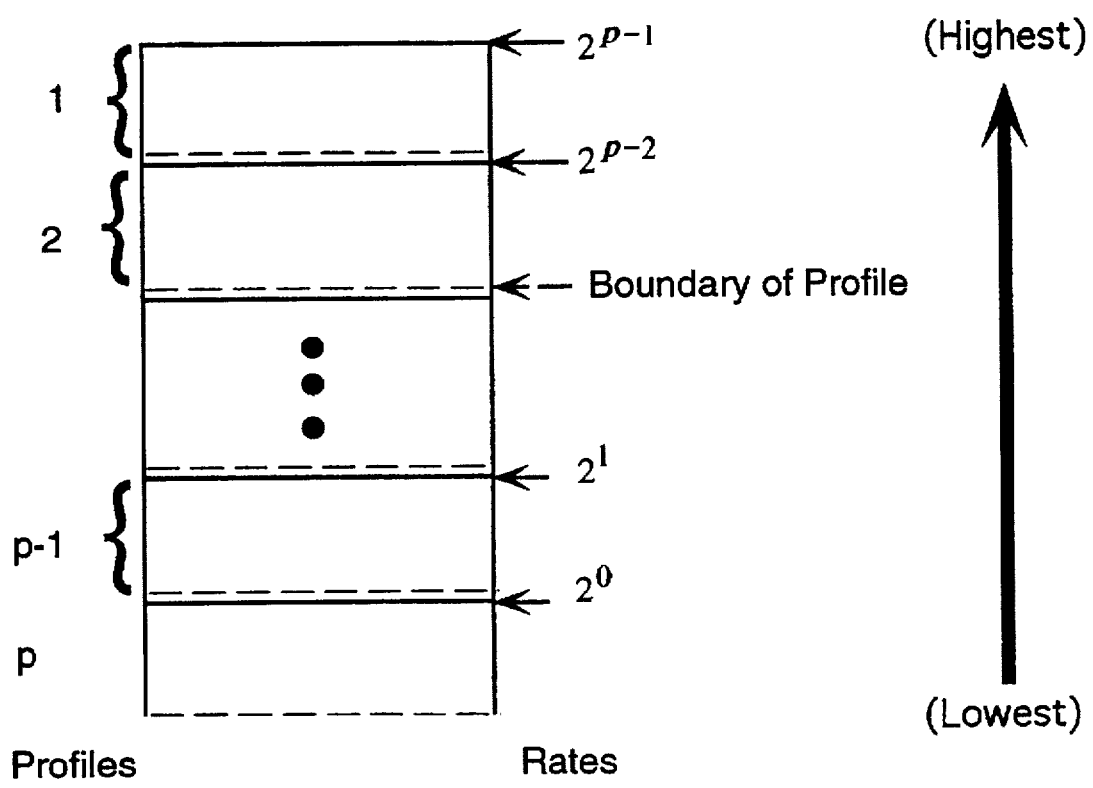
FIG. 3 illustrates servicing of profiles in accordance with a "ping-pong" algorithm.

The objective of the "ping-pong" algorithm employed by ping-pong unit 16 is to service the profiles based on their exponent values. FIG. 3 shows a typical arrangement of a set of p profiles and their exponent values. The exponent value of profile i, where $1 \leq i \leq p$, is $2^{p-i}$. Since the exponent value of a given profile is twice the exponent value of the next lowest profile, servicing should be commensurate with exponent to guarantee fairness to all available profiles. Each profile may be subdivided into several subprofiles, depending on the selected granularity (either a linear or non-linear scale can be adopted). However, because the subprofiles are not essential to the basic ping-pong algorithm they are dealt with later.

Figure 4:
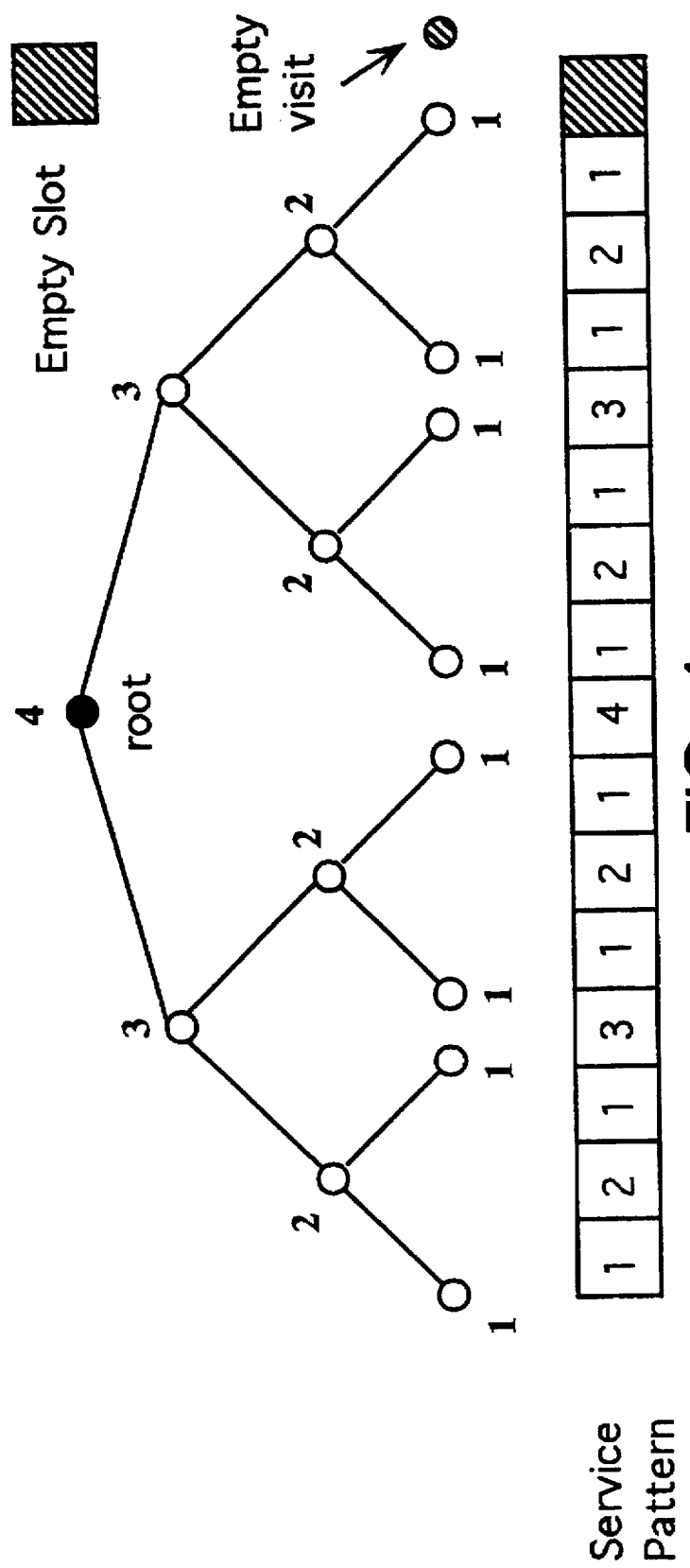
FIG. 4 illustrates one complete cycle of a binary tree pattern for servicing four profiles in accordance with the ping-pong algorithm of FIG. 3.
Figure 5:
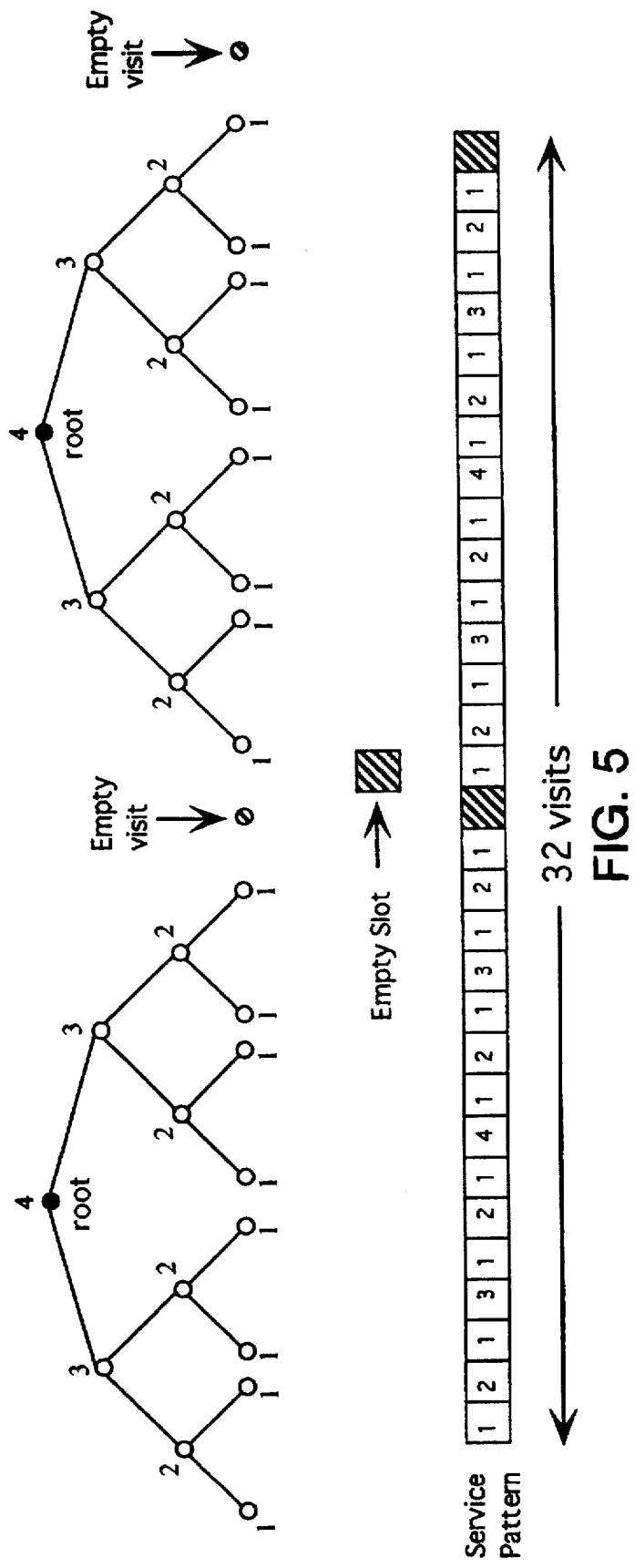
FIG. 5 is similar to FIG. 4, but shows two complete cycles.

The ping-pong algorithm operates on the basis that the service time (i.e. the time for each visit) is twice as fast as the rate of the highest profile. In other words, the visiting rate is $2^p$. Thus, the first (highest) profile is visited every 2 steps, the second profile is visited every 4 steps, the ith profile is visited every $2^i$ steps and the pth (lowest) profile is visited every $2^p$ steps. The ping-pong algorithm therefore generates an address trace whose pattern follows a complete binary tree. If p is the number of profiles, then one complete traversal produces $2^p-1$ addresses. One empty address slot is generated at the $2^p$th step to maintain consistency and to ensure that the service class of any of the profiles is not violated. An example is shown in FIG. 4 for p=4. After 15 slots, an empty slot is added to make up a full cycle of $2^4=16$ slots and the pattern repeats as illustrated in FIG. 5 for two 16-slot cycles.

The slot utilization, $\chi_i$ which is the service rendered to each profile, is given by $$\chi_i = \frac{2^{p-i}}{(2^p-1)+1} = 2^{-i} \qquad (4)$$

Thus asymptotically, when $p \to \infty$ the total slot utilization $$\gamma = \sum_{i=1}^{p} \chi_i \qquad (5)$$

reaches 100%. However, even for small values of p, the efficiency is quite acceptable, as shown in Table 2.

TABLE 2

| Number of Profiles p | Total Slot Utilization γ |
|---|---|
| 2 | 75.00% |
| 4 | 93.75% |
| 8 | 99.61% |
| 12 | 99.98% |
| 16 | 99.998% |

The complete binary tree and the empty slot are easily generated by a counter whose size is at least p bits, and a comparator block. If count is the output of a standard binary counter p bits wide, then profiles are output as follows:

If count=0, output profile 0. (Profile 0 is the null or empty slot).

If count=(1,3,5,7, ..., $2^p-1$), output profile 1.

If count=(2,6,10,14, ..., $2^p-2$), output profile 2.

If count=(4,12,20,28, ..., $2^p-4$), output profile 3.

If count=$2^{p-1}$, output profile p.

The above conditions are easily deciphered with modulo $2^i$ arithmetic, such that if (count % $2^i = 2^{i-1}$), then profile i can be sent to the output for $1 \leq i \leq p$ where % indicates modulo operation. count % $2^i$ is equivalent to extracting the least significant i bits of count and hence can be easily calculated (see R. Sivakumar and N. J. Dimopoulos, "VLSI Architectures for computing X mod m", IEE Proceedings—Circuits, Devices and Systems, Part G, vol. 142, no. 5, pp. 313–320, October 1995).

Virtual Time Dispatcher

Virtual time dispatcher 18 uses the concept of virtual time to arbitrate and ensure that profiles do not violate their assigned cell rates (over the long term) and thereby statistically maintain the average transmission rate of each profile/subprofile closer to their marked rates. The virtual time dispatcher employs a modified version of a prior art virtual clock scheme (see L. Zhang, "Virtual Clock: A New traffic Control Algorithm for Packet Switching Networks", ACM SIGCOMM90, pp. 19–29, Philadelphia, September 1990). The modified implementation does not require expensive sorters and uses a simpler linear search scheme to schedule the subprofiles from the highest to the lowest rates.

It is convenient to define the following terms, which are hereafter employed in order to assist those skilled in the art in comprehending the invention.

Cell_delay: a fixed number of system clock cycles during which a subprofile address is sent to the profile queue, i.e. a fixed quantum of time devoted to servicing a given subprofile. Cell_delay is calculated as the reciprocal of twice the rate of the highest profile, scaled by the system clock frequency f. Thus:

$$\text{Cell-delay} = \frac{f}{2 \times 2^{p-1}} = \frac{f}{2^p} \qquad (6)$$

since ping-pong unit 16 runs at twice the highest rate. Obviously, the higher the system clock frequency, the greater the number of cycles available per Cell_delay. For implementation purposes, Cell_delay is easier to calculate if the system clock frequency is a power of 2. In this case, we have:

$$\text{Cell-delay} = 2^{f_c-p} \text{ where } f_c = \log_2 f \qquad (7)$$

Current_Cell_time (CCT): a variable used to keep track of virtual time and as a reference for scheduling cells of a profile. It is updated every time a profile is visited, irrespective of whether a valid subprofile exists or not. The new value of CCT is given by:

Current_cell_time=Current_cell_time+Cell_delay

CCT is virtual in the sense that whenever a profile is visited by ping-pong unit 16, although several valid subprofiles may be ready for dispatch, CCT is incremented only once for that profile visit. This has the advantage of avoiding aliasing (i.e different profiles being sent at the same (lower) rate) and maintaining an efficient spread of the rates.

Next_Cell_time (NCT): an important variable used to calculate the exact time when a particular subprofile is to be transmitted next to the profile queue. The calculation is based on the current value of NCT and the reciprocal of the actual cell rate (ACR) of the subprofile (determined by table lookup, or other suitable means), normalized to the appropriate system clock frequency f. In other words, the time domain is converted to an arbitrary count of the system clock for the purpose of simple hardware implementation. Therefore, the recurrence relation for NCT is given by:

$$\text{Next-cell-time} = \text{Next-cell-time} + \left(\frac{1}{ACR}\right)f \qquad (8)$$

$$= \text{Next-cell-time} + \left(\frac{1}{ACR}\right)2^{f_c} \qquad (9)$$

where ACR is expressed as a 14-bit Floating point number. The initial value of Next_cell_time[0] is 0 for all subprofiles.

FIG. 6 is a pseudo-code listing of the algorithm performed by virtual time dispatcher 18. Initially, it is assumed that each profile has a vector in memory which holds the following entries for each subprofile: (1) Next_cell_time (NCT)—for scheduling; and, (2) Availability—indicates whether a VC is attached or not. If the availability bit for a particular subprofile is 0, this implies that no VCs are attached and that the corresponding subprofile is empty. At FIG. 6, line (1) a selected profile p is tested to ensure that it is non-zero. At lines (2)–(4), that profile's availability vector is retrieved and, starting from the highest rate for each available subprofile (line (6)), a linear scan is initiated. The NCT value is retrieved from memory at Line (8) and compared with the current value of cell_time. If the current cell_time is greater than or equal to NCT then the particular subprofile number is dispatched to the profile queue (line (9)) and the new value of NCT is calculated at line (10) and written back into the memory (line (12)) for later use. If the current cell_time is less than NCT then a null pointer is output if the following conditions are satisfied:

1. All valid subprofiles (lines (15)–(17)) fail the NCT test (i.e. current cell_time is less than NCT for all valid subprofiles).
2. The availability vector is empty for the selected profile p_num (i.e. no VCs are attach-ed), (lines (20)–(22)).
3. Profile p_num is zero (line (23)–(26)).

NCT is updated at lines (18), (21) & (25) to compute the next virtual time for each profile visit, as the case may be. Note that a null pointer may be interpreted as a state where a predefined value is written to the queue. Also note that the foregoing discussion assumes an infinite queue, whereas the queue will be of finite length in any practical embodiment. This raises the classical reader-writers problem between profile generator 10 and the virtual circuit processor 14, necessitating proper synchronization of the two.

It is also noteworthy that the counter used to track the cell_time will have a finite word length and thus comparison problems (see FIG. 6, line 10) will surface when the counter value rolls over. As explained below in the section headed "Counter Overflow", these problems are solved by deriving bounds on the CCT and NCT word lengths for a given system clock frequency f and performing simple arithmetic modulo operations.

Based upon the foregoing discussion, it will be understood that profile generator 10 can be synthesized with the pingpong and virtual_time_dispatcher modules shown in FIG. 7. The input to the Profile_generator() procedure includes the NCT and the availability vectors for all profiles. A stop signal stored in memory 13 indicates that ABR output queue 15 is full and is used to terminate the Profile_generator() procedure. Otherwise, the Profile_generator() procedure is repeated indefinitely.

Virtual Circuit Processor

The foregoing discussion assumes that profile generator 10 produces a sequence of profile addresses by sampling at twice the rate of the highest profile. In other words, each cell time is proportional to the reciprocal of $2^P$ where the total available bandwidth is equal to the highest rate i.e, $2^{P-1}$. Therefore, before virtual circuit processor 14 can place the VCs on the ABR queue where each slot corresponds to $1/2^{P-1}$, it must preprocess profile queue 12 to effect the translation such that the cells are spaced at the Line rate ($2^{P-1}$). The Virtual_Circuit_Preprocessor algorithm (FIG. 8) summarizes this translation procedure. The profile queue is scanned, two entries at a time, and a check is made to determine whether the scanned entries are empty or not. The following case scenarios are possible:

Case 1: both entries are null (lines (6)–(10)).
Case 2: one entry is null and the other is not (lines (11)–13) & Lines (15–17)).
Case 3: both entries are non-null (i.e. contain valid profiles) (lines (18)–(21)).

For Case 1, the two null (i.e. empty) slots each corresponding to a period of $1/2^P$ are merged into a single time slot of period $1/2^{P-1}$. For Case 2, the non-null profile is scheduled to occupy a time slot of period $1/2^{P-1}$. For Case 3, both entries are valid and hence must be scheduled in two successive periods. Consequently, one period is lost for every two profiles sent in this fashion. By using a variable lag, the number of such occurrences can be tracked so that if an empty slot is found (as in Case 1), that time slot can be effectively utilized (see FIG. 8, lines (6)–(10)). Use of the lag variable accordingly improves the effective throughput, particularly for under-provisioned cases (hereinafter defined).

Figure 9:
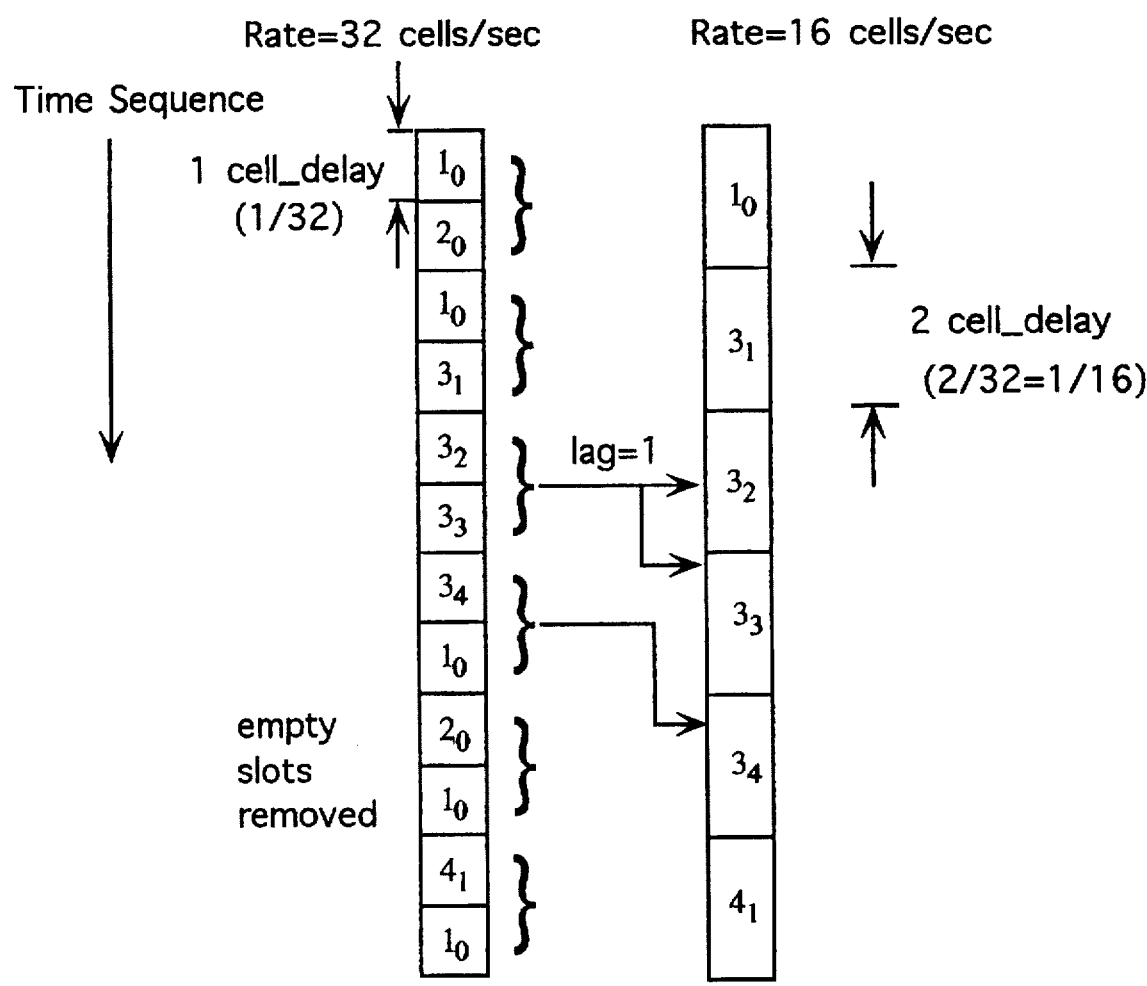
FIG. 9 illustrates implementation of the FIG. 8 algorithm to translate from a rate of 32 cells per second to a rate of 16 cells per second.

FIG. 9 illustrates implementation of the FIG. 8 preprocessing algorithm. In FIG. 9, a basic cell_time corresponding to a rate of 32 cells/sec (left side) is merged to create a cell rate of 16 cells/sec on the right. Observe that subprofiles $3_2$ and $3_3$ consume 2 cell_times each on the right side, implying a loss of one 2 cell_time period which is recovered when empty profiles ($2_o$ and $1_o$) are visited subsequently.

ATM Cell Transmission

The "line rate" is the rate at which a physical transmission medium such as a fiber-optic network transports data. e.g. SONET STS-3c provides a line rate of 155 Mbps. The "payload rate" (PR) is the rate at which useful information (e.g. ATM cells) is carried over a transmission medium. For the SONET STS-3C example, a typical PR is approximately 150 Mbps. The maximum ATM cell rate is thus PR/(53×8) =PR/424 cells per second, which consequently sets an upper bound on the PCR for a given implementation.

In the context of the present application's definition of profiles and subprofiles, the maximum ATM cell rate constitutes the cell rate of subprofile 1 of profile 1 and therefore any VCs attached to this subprofile will occupy the maximum bandwidth in an ATM connection. Preferably, profile generator 10 runs at μ times the maximum ATM cell rate and fills profile queue 12 with subprofile entries. Virtual circuit processor 14 dispatches VCs to ABR output queue 16 at a rate equal to 1/μ of the rate of profile generator 10, thereby achieving the maximum ATM cell rate.

In implementing the pingpong algorithm, a speed-up factor of μ=2 is selected. A higher value of μ could be selected, but the number of profile entries would then have to be increased, thereby increasing the memory overhead and reducing the number of system clock cycles available for servicing each subprofile.

Simulation

To characterize the performance of the FIG. 7 profile_generator algorithm, a Matlab program was written and several case studies were simulated, as hereafter summarized. For the sake of tractability and computational simplicity, the number of profiles p=5 and subprofiles sp=4 were chosen, for a total of 20 entries. The system clock frequency was set at 256 hz ($2^8$). In this example, each cell_time corresponds to 8 cycles at a rate of 32 cells per second. Profile 1 has the largest exponent since its ACR is 16. This also corresponds to the maximum bandwidth available. It is useful to define the terms "over-provisioned", "under-provisioned" and exact-provisioned" as follows: if the sum of the bandwidths of the available subprofiles exceeds the peak rate (16 in this case), then we have an "over-provisioned" case; if the sum of the bandwidths of the available subprofiles is less than the peak rate we have an "under-provisioned" case; and, if the sum of the bandwidths of the available subprofiles equals the peak rate we have an "exact-provisioned" case. The effective rate for each profile/ subprofile was measured and the resultant bandwidth was compared with the specified rates for a simulation run consisting of 4096 profile visits.

It is convenient to define the following terms, which are hereafter employed in order to assist those skilled in the art in comprehending the invention.

Virtual time: the time required to service all subprofiles (within a profile) in one cell_time.

Figure 10:
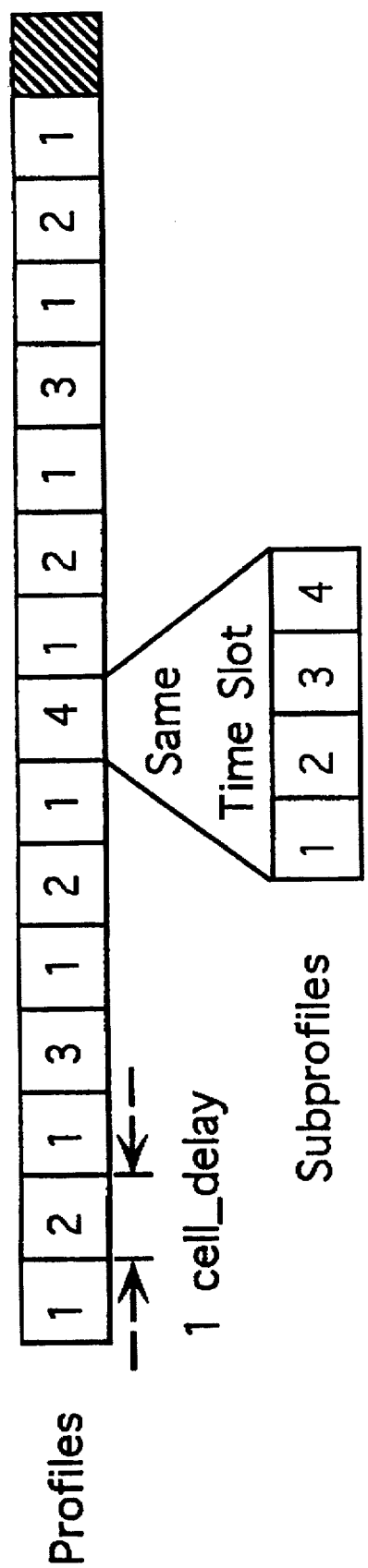
FIG. 10 depicts a virtual time sequence in which sub-profiles are scheduled simultaneously in a given time slot.

Virtual time sequence: a sequence of profiles scheduled in virtual time. FIG. 10 shows a virtual time sequence in which sub-profiles are scheduled simultaneously in the same time slot.

Virtual throughput: measures the rate of the various profiles as if cells scheduled in the same time slot by the profile generator are dispatched simultaneously. Note that the sampling frequency is twice as fast as the highest profile's rate.

Real time sequence: a sequence of subprofiles (or empty profiles) which are scheduled one cell_time each successively in real time.

Real throughput: measures the actual throughput, assuming that the VCs in the profile queue are dispatched by the virtual_circuit_preprocessor as a real time sequence.

The ratio of the measured rate to the desired (specified) rate given by the quantity λ illustrates the proximity of the scheduled rate to the ideal. Performance improves as the value of λ increases.

Bandwidth utilization: the relative bandwidth used by each profile/subprofile with respect to the maximum bandwidth.

Two different methods for implementing the scheduler algorithm will now be discussed; namely, sequential scheduling and parallel scheduling.

Sequential Scheduling

Figure 11:
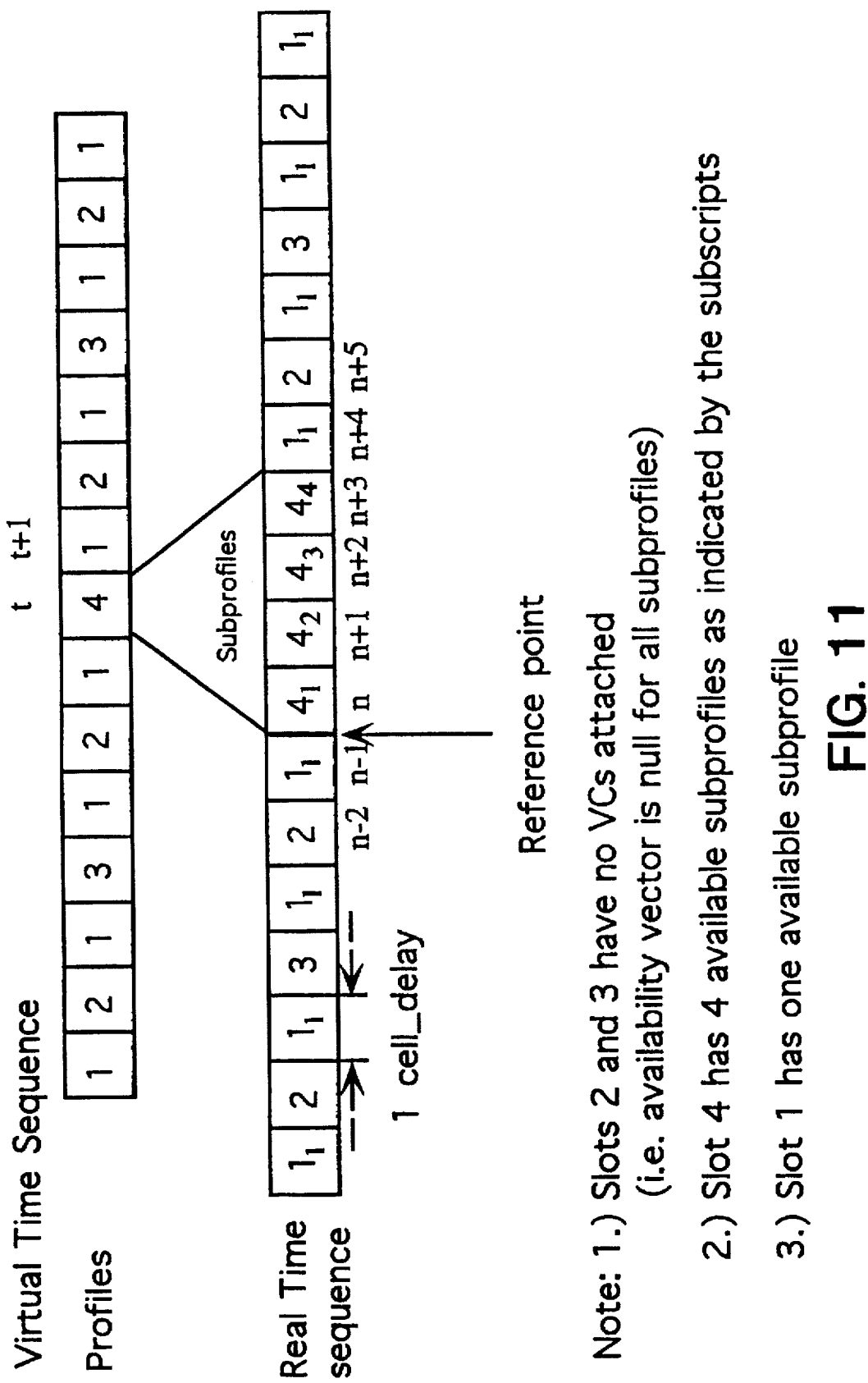
FIG. 11 illustrates sequential scheduling of a profile queue in accordance with the invention.
Figure 12B:
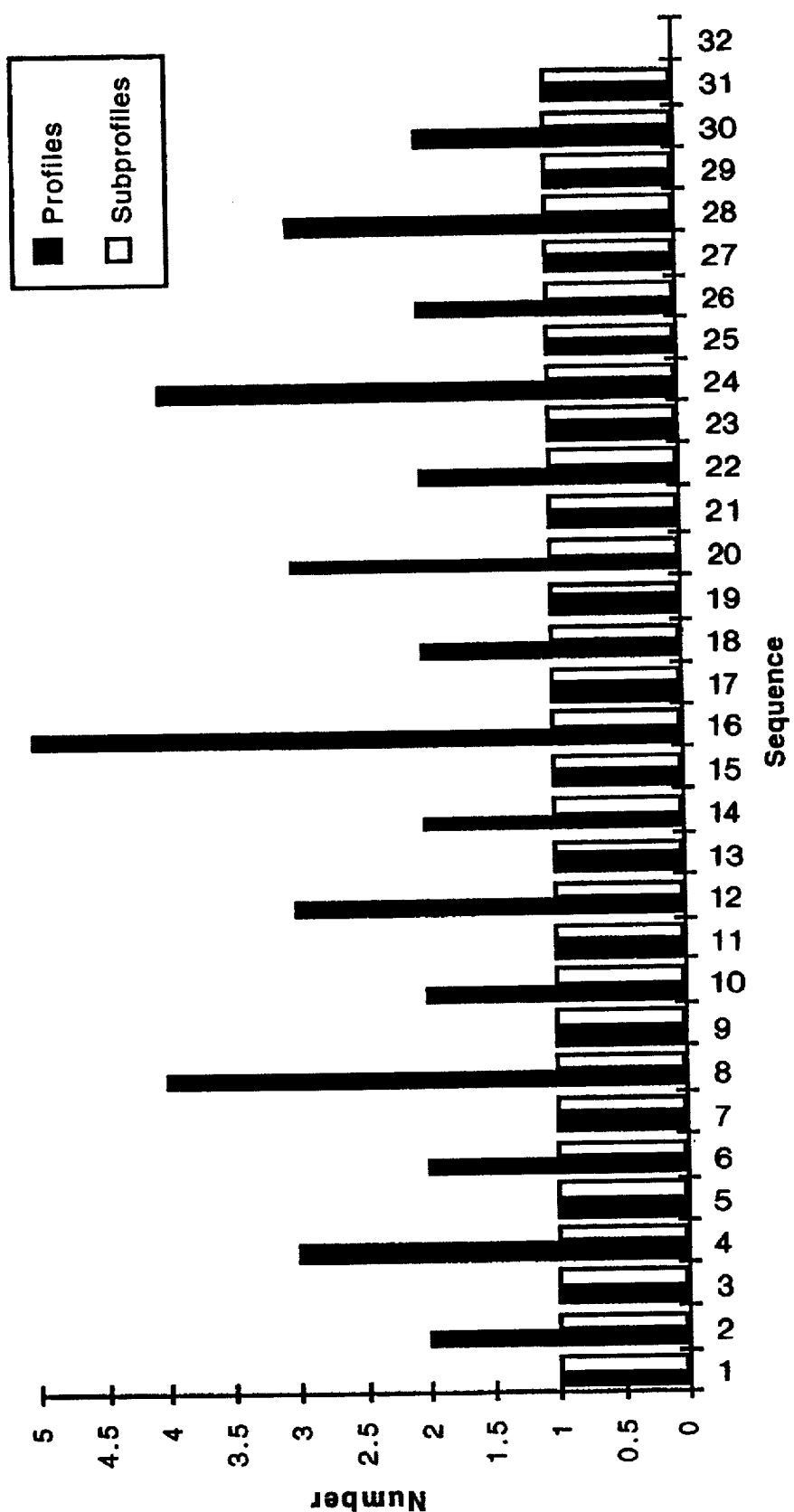
Figure 13B:
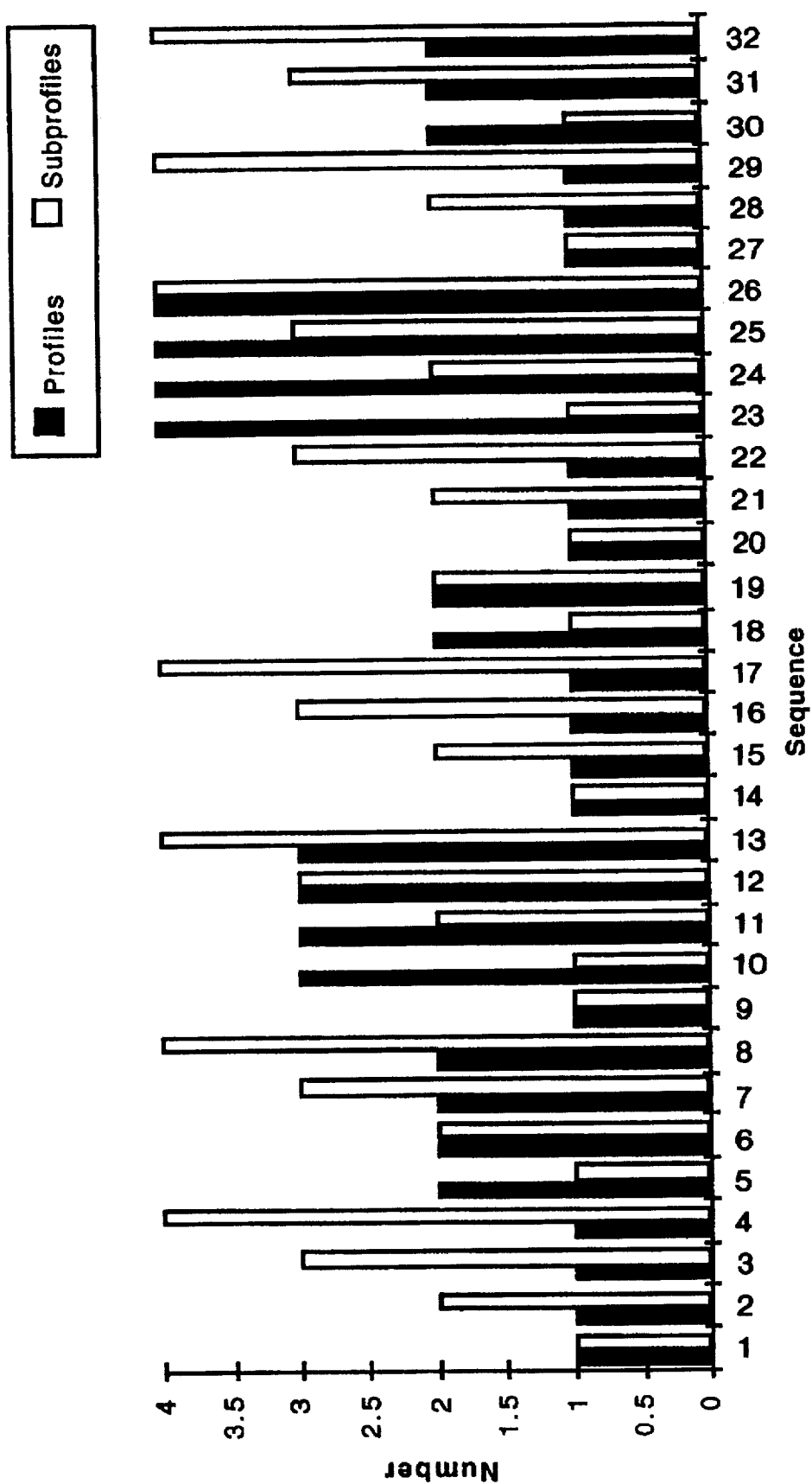
Figure 14B:
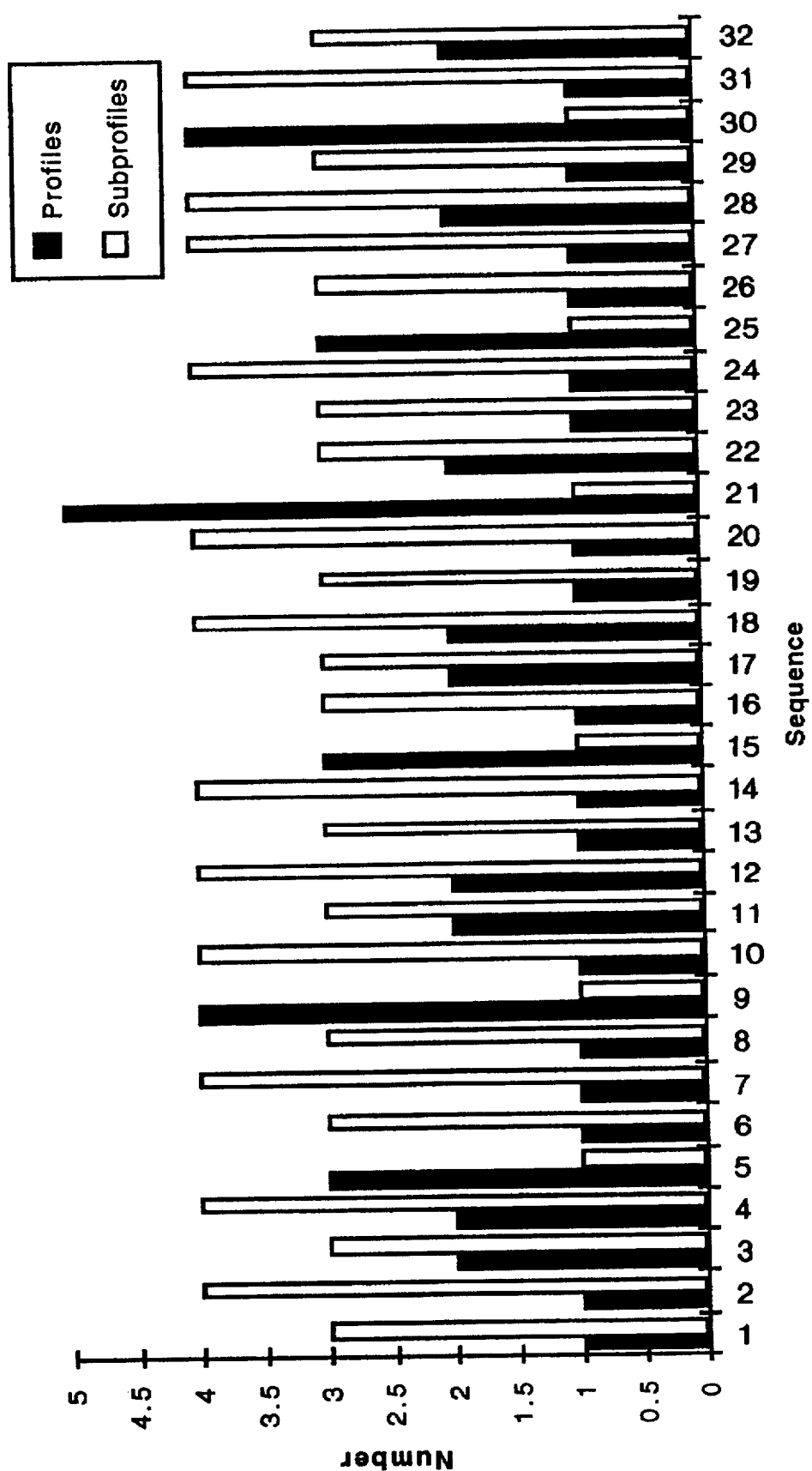
Figure 15B:
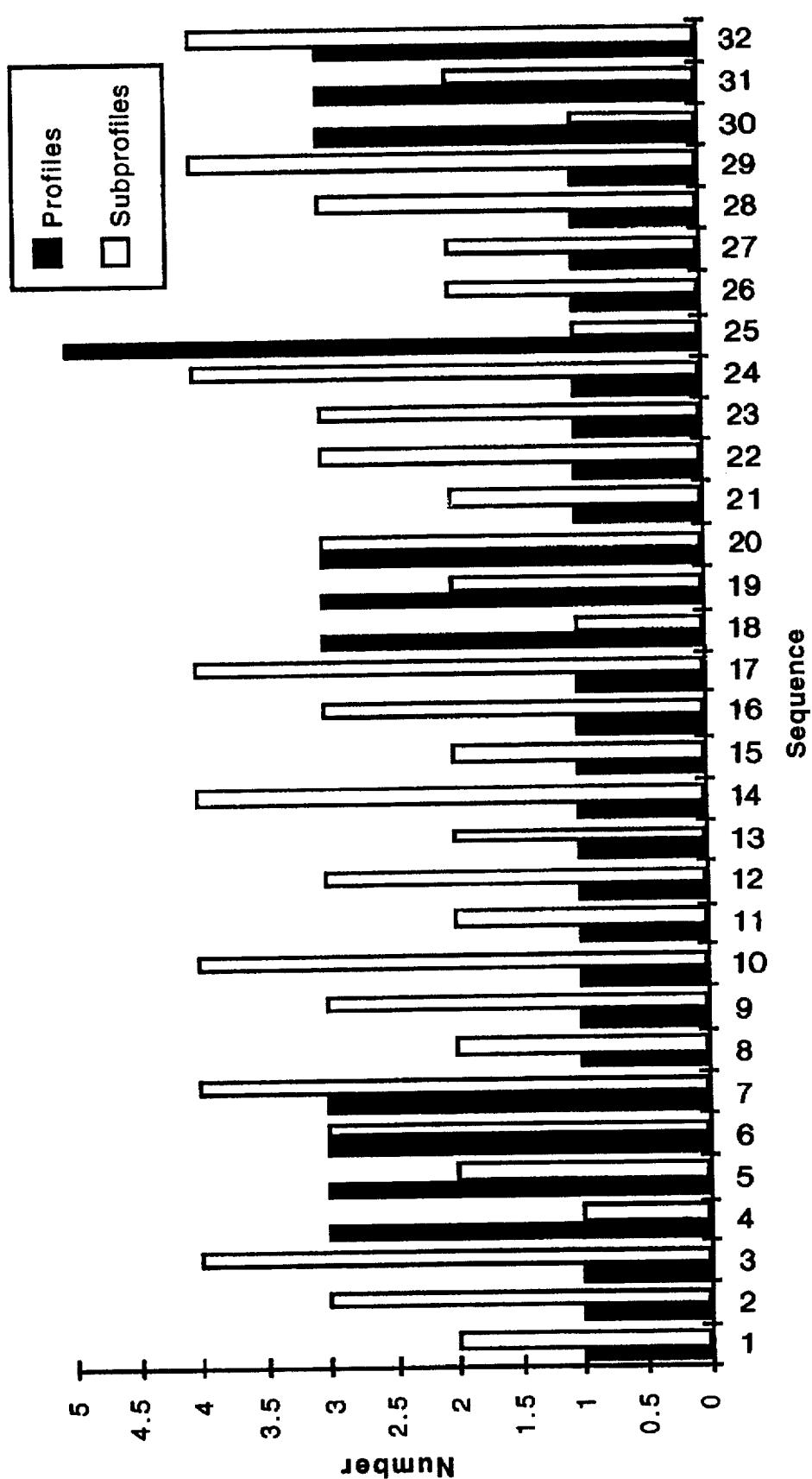
Figure 16B:
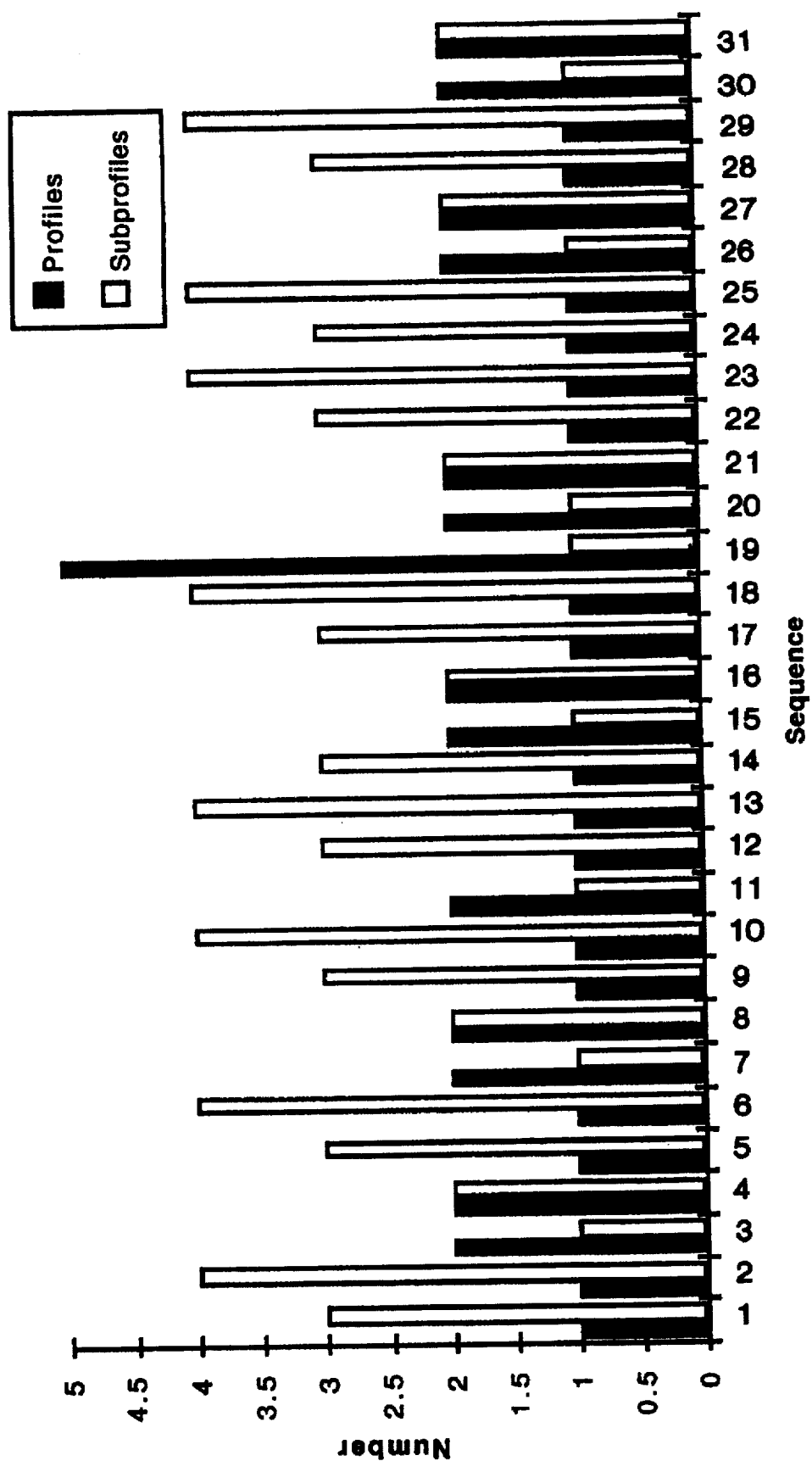
Figure 17B:
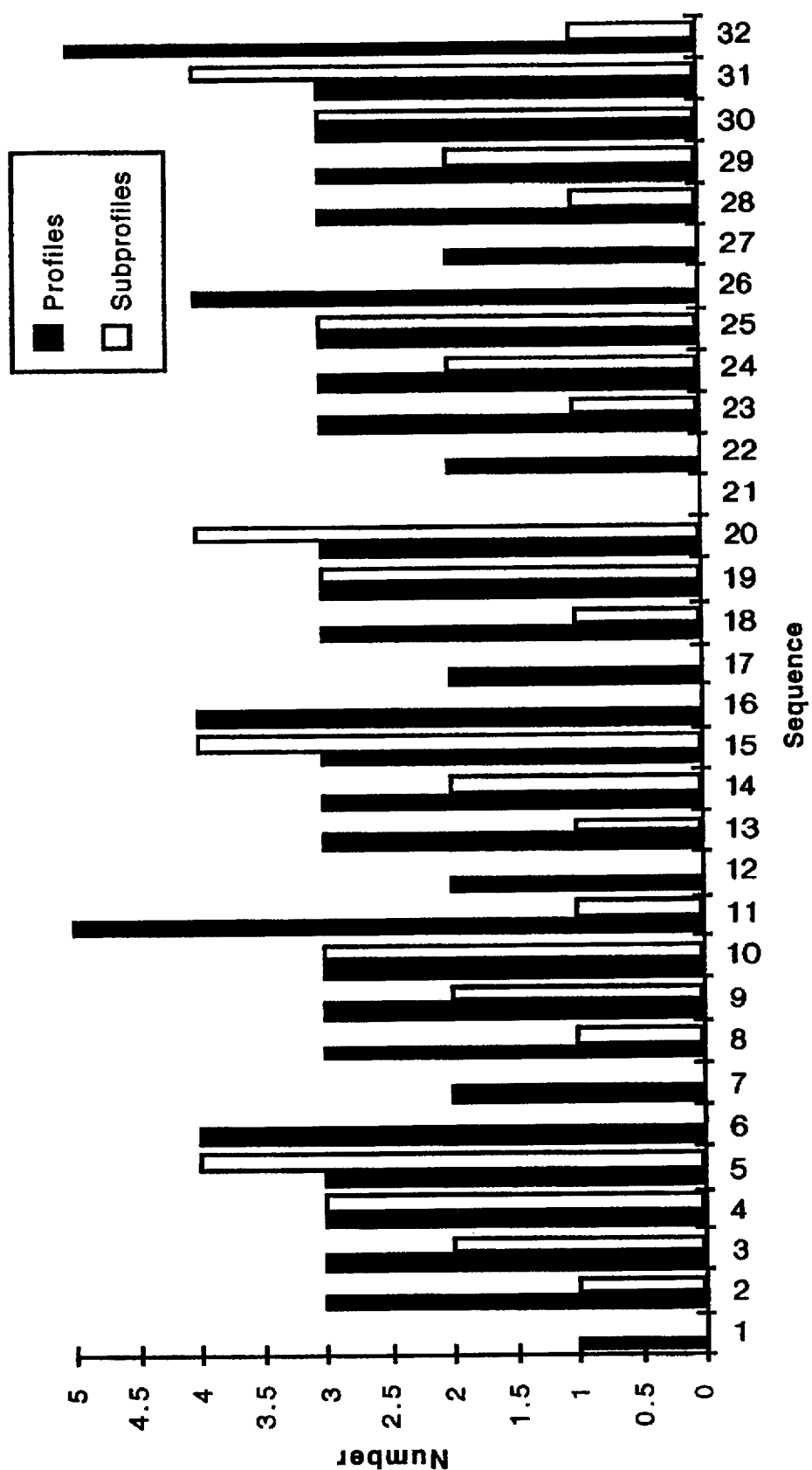
Figure 18B:
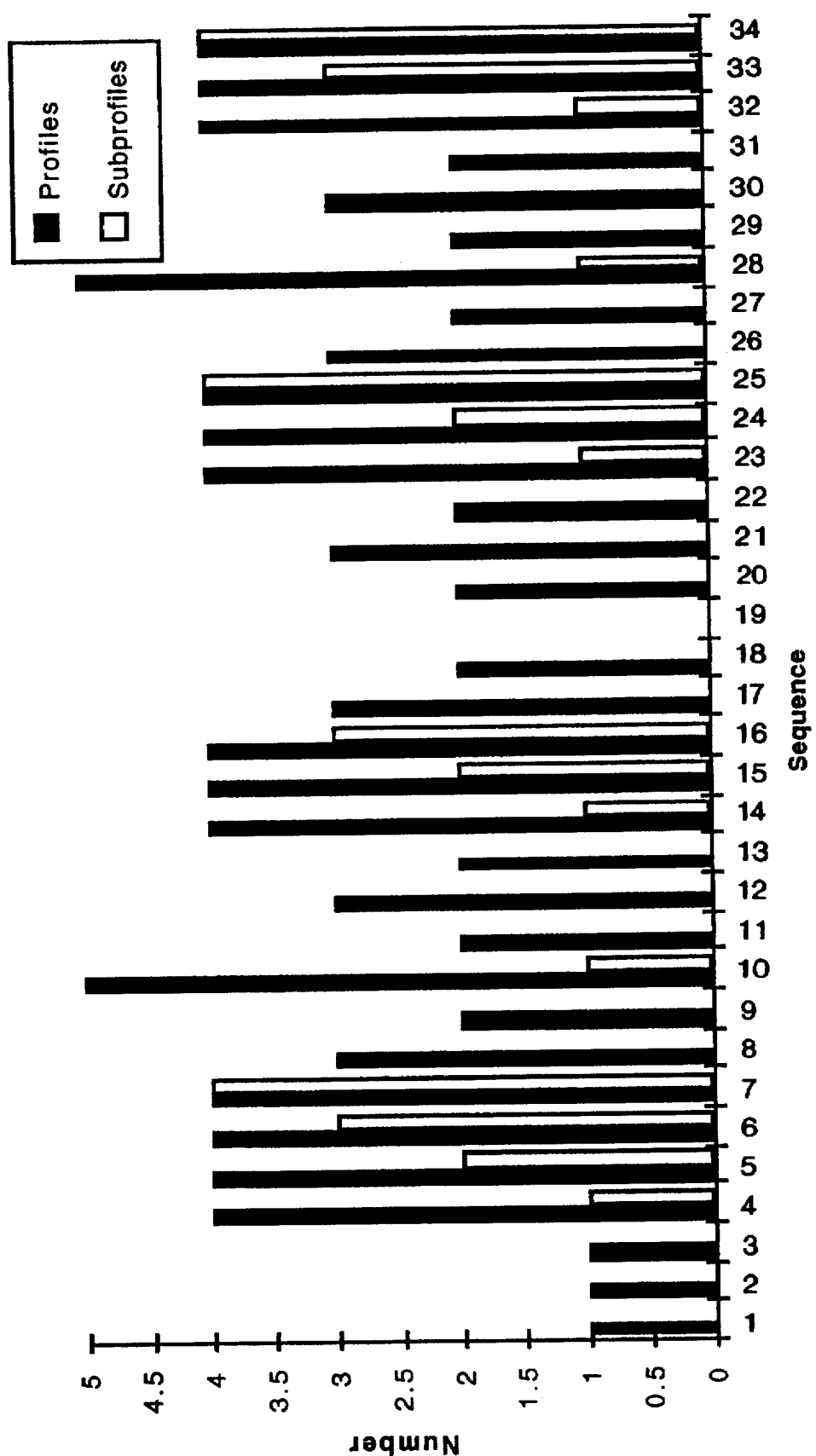
Figure 19B:
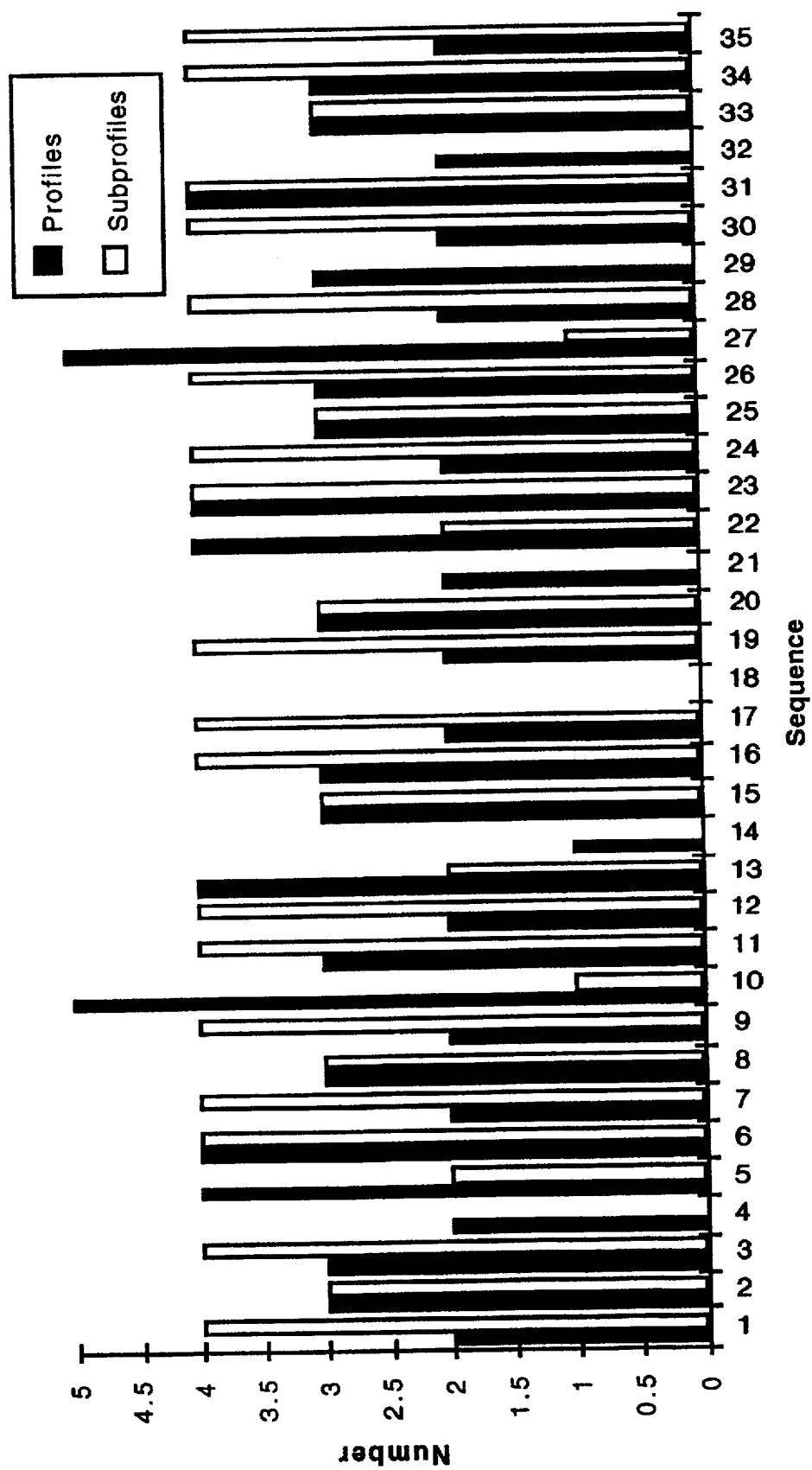
Figure 20B:
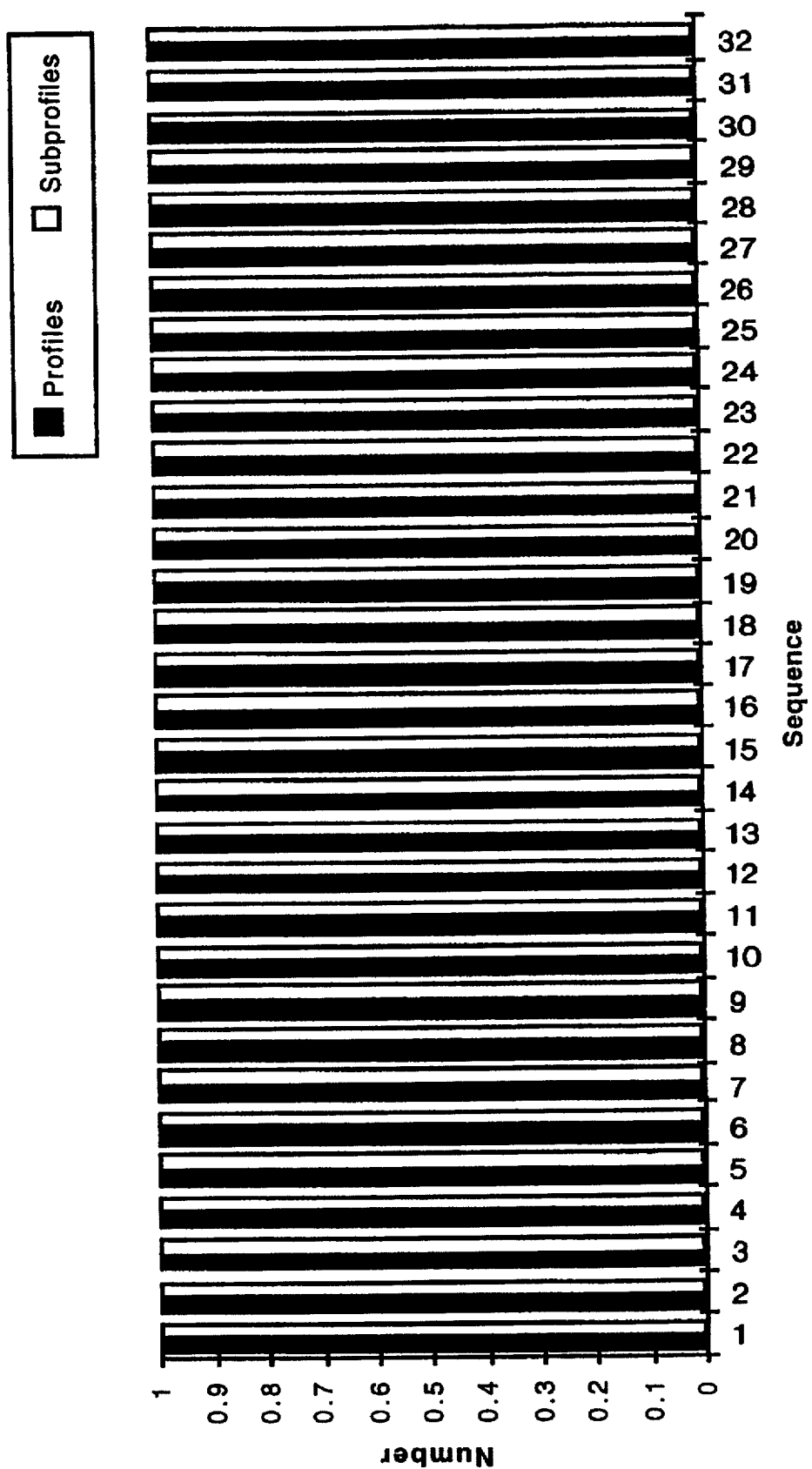

In this method, all subprofiles that are ready on a given virtual time slot t, as arbitrated by virtual time dispatcher 18, are dispatched in sequence one at a time to profile queue 12, as shown in FIG. 11. When the next profile is serviced at virtual time t+1, any valid subprofiles are dispatched by incrementing the sequence number as appropriate. If the profile is empty, then a null slot is generated at that point. As seen in FIG. 11, subprofile $1_1$ has a sequence number n+4 which follows subprofile $4_4$, where the subscripts denote the subprofile numbers.

Nine test cases were selected to study the performance of the scheduler algorithm. The simulation results are summarized in FIGS. 12–20 and represent the actual profile/subprofile numbers output by the virtual circuit preprocessor as per the FIG. 8 algorithm.

Parallel Scheduling

The sequential scheduling method discussed above tends to degrade performance when the higher profiles are empty. This typically occurs in under-provisioned cases and to some extent in over-provisioned cases, since when a given profile is serviced, all of the subprofiles that are ready to be sent are allocated one cell time each. Then, when a next higher profile is subsequently visited by ping-pong unit 16, and assuming such profile to be empty, the algorithm schedules an empty slot following the last subprofile slot. This reduces throughput, even though there is unutilized bandwidth. One may attempt to improve bandwidth allocation by performing a lookahead search of the succeeding profile and if it is empty, merging its time slot with that of the previous subprofile, giving a spacing of at least 1 cell_time to maintain virtual time integrity. In other words, an empty (succeeding) subprofile is overlapped on an occupied subprofile's time slot, such that the minimum gap is 1 cell time, since virtual time (t+1)−t=1. This increases the effective throughput of the profiles since the relative slot distribution is shorter in duration compared to the sequential case.

Figure 21:
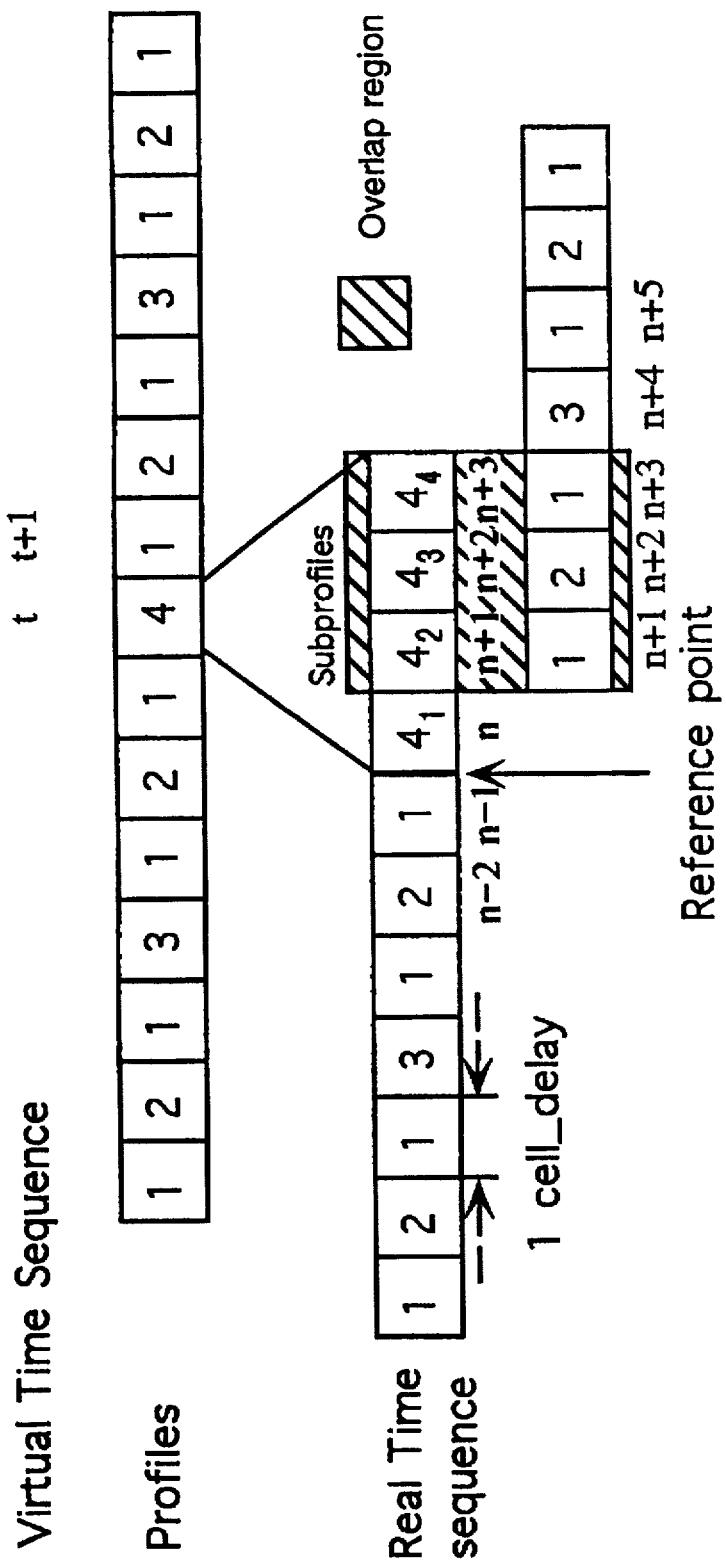
FIG. 21 illustrates parallel scheduling of a profile queue in accordance with the invention.

FIG. 21 provides a clarifying example in which profiles 1, 2, and 3 are empty and in which profile 4 has four subprofiles $4_1$, $4_2$, $4_3$, $4_4$. At virtual cell_time t, the profile generator determines that profile 4 needs servicing and all four of its sub profiles are ready for dispatch to the profile queue starting at real time sequence n. Each of the four dispatched subprofiles consumes one cell_time. Subprofile $4_1$ is sent at time sequence n, subprofile $4_2$ at time sequence n+1, subprofile $4_3$ at time sequence n+2 and finally subprofile $4_4$ at time sequence n+3. Next, the profile generator visits profile 1 at virtual cell time t+1, as determined by the ping-pong algorithm. Since profile 1 is empty, this time slot can be overlapped with the one allocated to subprofile 4, starting from the second sub-profile $4_2$ at time sequence n+1. In this example, 3 cell_time slots are saved, or equivalently the effective throughput can be expected to be greater compared to the sequential case where profile 1 will be sent only at time sequence n+4.

The performance of the parallel scheduling method depends very much on the profile distribution and on which slots are empty. In the worst case, its performance defaults to that of the sequential scheduling method, while in the best case, the effective throughput will be closer to the virtual throughput. The aforementioned simulation was repeated, in relation to the parallel scheduling method, for the 9 case studies presented previously. The case study results, tabulated in FIGS. 22–30, reveal the performance of the parallel scheduling method to be better than or equal to that of the sequential scheduling method, including the overprovisioned case.

The case study results tabulated in FIGS. 22–30 assume that only one VC is linked to each subprofile. FIGS. 31(a) and 31(b) tabulate the results of additional case studies representative of the more general case in which multiple VCs may be linked to each subprofile. For clarity, only valid VCs are depicted. It can be inferred from the overprovisioned case study results tabulated in FIG. 31(a) that the effective bandwidth allocated to all VCs (including those in the linked list) is scaled down by a factor of R=65/16= 4.0625. For the underprovisioned case (FIG. 31(b)), the algorithm achieves very high efficiency (close to 100%) in bandwidth distribution and none of the VCs in the link list are deprived of their respective desired bandwidth allocations.

Congestion Management

Congestion may also occur when the sum of the bandwidths of the allocated connections exceeds the maximum bandwidth supported by the network. In such a situation, a given fairness criteria has to be applied such that the bandwidth is shared effectively and efficiently by all users. The present invention implements a rate weighted bandwidth allocation scheme wherein the available bandwidth is shared depending on the ACRs of the profiles and excess bandwidth. For example, if the maximum bandwidth is 16 and the total bandwidth required is 32, then all of the allocated profiles have their ACRs (which are weighted on their rates) reduced by 50%.

Assume that $B_{max}$ is the maximum physical bandwidth available, and that there are l(i,j) VCs attached to subprofile j of profile i, where $1 \leq i \leq p$, and $1 \leq j \leq sp$. Also, let $B_{i,j}^k$ be the desired bandwidth of the $k^{th}$ VC in subprofile j of profile i as indicated by the weighted ACR values to which they are attached. Then the effective bandwidth achieved is:

$$\overline{B}_{i,j}^k = \frac{B_{i,j}^k}{R} \text{ where } R = \frac{\sum_{i=1}^{p} \sum_{j=1}^{sp} \sum_{k=1}^{l(i,j)} B_{i,j}^k}{B_{max}} \quad (10)$$

Observe that if R=1, then $\overline{B}_{i,j}^k = B_{i,j}^k$ and 100% efficiency is achieved.

Counter Overflow

A technique for solving the aforementioned counter overflow problem will now be discussed.

Figure 32:
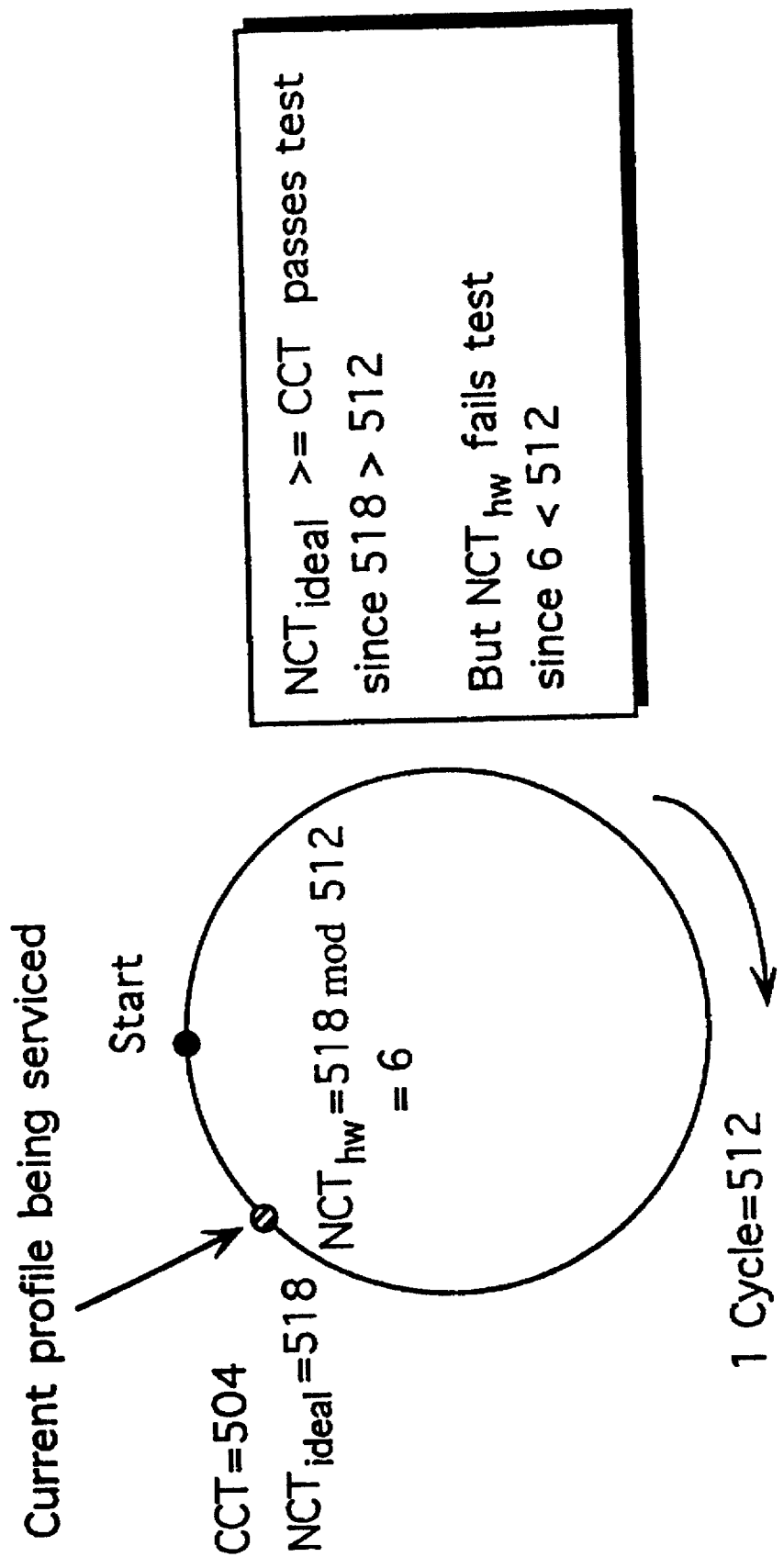
FIG. 32 illustrates a counter overflow problem by comparing an "ideal" implementation with a hardware implementation incorporating an 8 bit counter.

The current_cell_time (CCT) and next_cell_time (NCT) variables are incremented by profile generator 10 from the start (i.e. from time=0) and theoretically can extend up to infinity (or to a very large number, until execution is terminated). In a typical hardware implementation, the CCT and NCT parameters are usually embodied in finite length counters. If such counters are $f_e$-bits in length, the maximum count attainable is $2^{f_e}-1$, after which the counter overflows and counting recommences from 0 due to the inherent modulo $2^{f_e}$ arithmetic operation of the counter. Such overflow could result in incorrect operation of profile generator 10 as it compares successive values of CCT and NCT. FIG. 32 illustrates the problem by comparing an "ideal" implementation in which NCT=518, with a hardware implementation incorporating an 8 bit counter which, due to overflow of the counter, outputs a value of NCT=518 mod 512=6, which in turn produces incorrect results upon comparison with a value CCT=504.

The first step in solving the overflow problem is to calculate the maximum size of the NCT counter. As explained above (see equation (9) if f is the system clock frequency, then NCT is given by:

$$NCT = NCT + \left(\frac{1}{ACR}\right) 2^{f_e} \quad (11)$$

where $f_e = \log_2 f$. For ease of implementation, assume f to be a power of 2. Note that when ACR=1, (i.e the slowest profile), the scaled 1/ACR factor will be a maximum such that $2^{f_e}/ACR = 2^{f_e}$. Consequently, for other higher ACR rates, $f_e$-bits are sufficient to accommodate the scaled 1/ACR factor, since:

$$\left(\frac{1}{ACR}\right) 2^{f_e} \leq 2^{f_e} \quad (12)$$

Observe that for the fastest profile, $ACR = 2^{p-1}$ and we have:

$$\left(\frac{1}{ACR}\right) 2^{f_e} = 2^{f_e-p+1} \quad (13)$$

As explained above, the pingpong algorithm ensures that profile i is visited $2^{p-i}$ times during one cycle, where $1 \leq i \leq p$. Hence all subprofiles within profile i whose ACR is an integral power of 2 will be serviced $2^{p-i}$ times, while the other subprofiles in i (whose ACRs are not a power of 2) will be serviced in proportion to their respective rates. In other words, number of visits is roughly proportional to $1.xxxx \times 2^{p-i-1}$ where xxxx is non zero. Therefore, if an $f_e$-bit counter is used, the NCTs for all subprofiles whose ACRs are powers of 2 will be updated as follows for each cycle.

NCT=$1 \times 2^{f_e} = 2^{f_e}$ for ACR=1 since the slowest profile occurs once in one cycle. (A cycle is equal to $2^p$ visits.)

NCT=$2 \times 2^{f_e-1} = 2^{f_e}$ for ACR=2 since the next slowest profile occurs twice in one cycle.

NCT=$2^{p-1} \times 2^{f_e-p+1} = 2^{f_e}$ for $ACR=2^{p-1}$ since the fastest profile occurs $2^{p-1}$ times in one cycle.

If a counter of length=$f_e$ bits is used to represent NCT, then due to the modulo operation of the counter, all subprofiles which are integral powers of 2 will become 0.

For the case in which the subprofiles are not integral powers of 2, the NCT value is approximately given by:

To determine an upper bound on the above equation, consider a subprofile whose ACR is $1.xxxx \times 2^{p-i-1}$, i=1, . . ., p. Since $$NCT = \lceil 1 \cdot xxxx \times 2^{p-i-1} \rceil \times \left(\frac{1}{ACR}\right) 2^{f_e} \quad (14)$$

this falls in to the profile belonging to a higher rate, i.e. $2^{p-i}$, it will be visited $2^{p-i}$ times. Hence, the 1/ACR factor is given as:

$$\left(\frac{1}{1 \cdot xxxx \times 2^{p-i-1}}\right) 2^{f_e} < 2^{f_e-p+i+1} \quad (15)$$

and its NCT will be bounded from above by $$NCT < 2^{p-i} \times 2^{f_e-p+i+1} = 2^{f_e+1} \quad (16)$$

The significance of the foregoing analysis is that for each cycle, the NCT values are bounded and the counter does not overflow more than twice. Hence the values can be represented by $f_e+1$ bits. The width of the CCT counter is determined in the same manner. Note that for one full length cycle of $2^p$ visits, the total increment in CCT is given by:

$$CCT = 2^p \times \text{Cell\_delay} = 2^p \left(\frac{f}{2^p}\right) = 2^{f_e} \quad (17)$$

As explained above, the Cell_delay is a fixed number of clock cycles attached to each profile. It is equal to $f/2^p$.

Thus, CCT is bounded by $f_e$ bits. Consequently, the CCT value overflows (rolls over) for every cycle, while the accumulated NCT value may overflow within a cycle depending on the ACR value of the associated profile. As a matter of fact, subprofiles having a smaller ACR value within a given profile will tend to overflow due to its higher 1/ACR factor. The NCTs of the respective subprofiles overflow their values during a given cycle only on their last service visit and are not compared again in the same cycle. If NCT is expressed with $f_e$ bits, then an extra flag bit can be added to record the cycle overflow. Similarly, an overflow bit can be used to track the CCT overflow.

Although the foregoing discussion shows that the storage requirements for CCT and NCT can be limited to $f_e+1$ bits, the problem in comparison mismatch between NCT and CCT remains. To solve this problem, it must be determined if there is difference in the most significant bits of the CCT and NCT values (i.e., the overflow flag bits). For clarity, the following variables are introduced:

1. CCT_global_overflow_bit: a variable having two possible states (viz. 0 and 1) such that on the completion of every full length cycle the value of CCT_global_overflow_bit toggles; thus CCT_global_overflow_bit= CCT_global_overflow_bit if CCT=$2^{f_e}$. The CCT_global_overflow_bit thus signifies the cycle boundaries.

2. NCT overflow bit (for each subprofile): when NCT is added to the scaled 1/ACR value as in Equation (11), NCT may overflow. NCT_overflow_bit is toggled if such overflow occurs; thus:

$$NCT\_overflow\_bit = \sim NCT\_overflow\_bit \quad (18)$$

$$\text{if} \left( NCT + \left(\frac{1}{ACR}\right) 2^{f_e} \right) \geq 2^{f_e}$$

3. Total_current_cell_time: a global variable that defines the value of the accumulated CCT for 1 cycle and is equal to $2^{f_e}$. This value is used for the arithmetic modulo operation while computing the updated values of the NCT and CCT.

4. Cycle_bit: a flag which indicates whether the NCT has been updated during the current cycle or was last updated during a previous cycle.

The CCT_global_overflow_bit and the CCT_overflow_bits of all subprofiles are initially cleared. When a valid subprofile is visited, the NCT_overflow_bits and CCT_overflow_bits are retrieved from memory. Before a (NCT≧CCT) comparison check is made, the following conditions must be verified:

A. If, during a given cycle, CCT_global_overflow_bit=Cycle_bit then the following checks are made:

(1) If CCT_global_overflow_bit=NCT_overflow_bit of a given subprofile, then the CCT and NCT for a given profile lie within the same cycle boundary. In other words, both may be in the 0 or 1 state and the algorithm proceeds with the NCT≧CCT comparison, with the NCT and CCT values unchanged.

(2) If CCT_global_overflow_bit≠NCT_overflow_bit for a given subprofile, an NCT overflow is implied and the new value of NCT is given by:

NCT_new=NCT_old+total_current_cell_time

B. If, during a given cycle, CCT_global_overflow_bit≠Cycle_bit then the following checks are made:

(1) If CCT_global_overflow_bit=NCT_overflow_bit of a given subprofile, then the CCT and NCT for a given profile lie within the same cycle boundary. In other words, both may be in the 0 or 1 state and the algorithm proceeds with the NCT≧CCT comparison, with the NCT and CCT values unchanged.

(2) If CCT_global_overflow_bit≠NCT_overflow_bit for a given subprofile, then CCT and the last recorded state of NCT differ by 1 cycle. If CCT_overflow_bit=1 (0) and NCT_overflow_bit=0 (1), then CCT has crossed a cycle boundary, while NCT has not. Therefore, before the NCT≧CCT comparison is made, the CCT value must be appropriately scaled because the NCT value would have a different overflow status in the previous cycle compared to CCT. Hence, the new value for CCT is given as:

CCT_new=CCT_old+total_current_cell_time

FIGS. 33(a), 33(b) and 34 are pseudo-code listings of the Virtual_time_dispatcher and Profile generator algorithms, incorporating the necessary modifications for dealing with the counter overflow problem in accordance with the solution presented above. In terms of implementation complexity, two extra bits per subprofile are required to store the nct_overflow_bit and Cycle_bit parameters. Therefore for a circuit with p profiles and sp subprofiles, the total number of storage locations required is p×sp×($f_e$+2). Furthermore, the CCT_global_overflow_bit requires 1 extra bit for the entire profile/subprofile set. Hence, total storage complexity is [($f_e$+2)×p×sp]+$f_e$+1. The modulo operations and comparisons are easily handled since total_current_cell_time is a power of two. The above algorithm with bounded values of counters was simulated in the case studies outlined above. The output of the program was found to be identical to that obtained where counters of infinite length are used.

As will be apparent to those skilled in the art in the light of the foregoing disclosure, many alterations and modifications are possible in the practice of this invention without departing from the spirit or scope thereof. For example, the sequential scheduling method is simpler and does not require much resource management such as lookahead, pipelining and buffering capabilities, in comparison to the parallel scheduling method. Accordingly, the scope of the invention is to be construed in accordance with the substance defined by the following claims.

What is claimed is:

1. A method of scheduling available bit rate cell transmission over an asynchronous transfer mode communication network characterized by a system clock frequency f and by a plurality of virtual circuit communication channels, each of said virtual circuits characterized by an allowed cell rate ACR expressed by mantissa and exponent portions, said virtual circuits further characterized by a next cell time and a current cell time, said method comprising:

(a) selecting those of said virtual circuits for which said ACR exponent portion is an exact power of two and grouping said selected virtual circuits into a set of p profiles, each of said profiles corresponding to one or more of said selected virtual circuits for which said ACR exponent portion is the same power of two;

(b) for each of said profiles, further grouping said selected virtual circuits into subprofiles, each of said subprofiles corresponding to one or more of said selected virtual circuits for which said ACR mantissa portions are linearly partitioned;

(c) prioritizing said profiles by reference to said ACR exponent portions, allocating highest priority to said profile corresponding to said selected virtual circuits for which said ACR exponent portion is highest, allocating lowest priority to said profile corresponding to said selected virtual circuits for which said ACR exponent portion is lowest, and allocating sequentially intermediate priorities to said profiles corresponding to said selected virtual circuits for which said ACR exponent portions are intermediate said highest and lowest exponent portions;

(d) servicing said profiles in priority sequence by referencing a profile having a given priority twice for each referencing of a profile having priority immediately lower than said given priority, said servicing further comprising comparing said prioritized profiles' next and current cell times to identify profiles corresponding to virtual circuits which are ready for transmission; and, (e) transmitting to an output queue said profiles identified as corresponding to virtual circuits which are ready for transmission.

2. A method as defined in claim 1, wherein:

(a) said prioritizing step further comprises prioritizing said subprofiles by reference to said ACR mantissa portions, allocating highest priority to said subprofile corresponding to said selected virtual circuits for which said ACR mantissa portion is highest, allocating lowest priority to said subprofile corresponding to said selected virtual circuits for which said ACR mantissa portion is lowest, and allocating sequentially intermediate priorities to said subprofiles corresponding to said selected virtual circuits for which said ACR mantissa portions are intermediate said highest and lowest mantissa portions; and, (b) said servicing step further comprises, for each of said serviced profiles having one or more subprofiles corresponding to a non-zero virtual circuit, linearly referencing said serviced profile's subprofiles in priority sequence by referencing subprofiles corresponding to said selected virtual circuits for which said ACR mantissa portion is higher before referencing subprofiles corresponding to said selected virtual circuits for which said ACR mantissa portion is lower, said subprofile servicing further comprising comparing said prioritized subprofile's next and current cell times and:
  (i) if said subprofile's current cell time is greater than or equal to said subprofile's next cell time, transmitting said subprofile to said output queue;
  (ii) if said subprofile's current cell time is less than said subprofile's next cell time, transmitting a null entry to said output queue.

3. A method as defined in claim 2, further comprising comparing successive pairs of entries in said output queue and:
  (a) if both of said compared entries are null, merging said two entries into a single entry of period $1/2^{p-1}$;
  (b) if one and only one of said compared entries is null, merging said non-null entry into a single entry of period $1/2^{p-1}$; and,
  (c) if both of said compared entries are non-null, merging each of said entries into respective entries of period $1/2^{p-1}$.

4. A method as defined in claim 3, further comprising overlapping, within said output queue, one or more sequentially ordered null entries with an equal number of sequentially ordered non-null entries which immediately precede said null entries.

5. A method as defined in claim 3, wherein each of said subprofiles includes a bandwidth allocation component $B_{i,j}^k$ of a total available bandwidth $\overline{B}_{i,j}^k = B_{i,j}^k/R$ where:

$$R = \frac{\sum_{i=1}^{p} \sum_{j=1}^{sp} \sum_{k=1}^{l(i,j)} B_{i,j}^k}{B_{max}}$$

$B_{max}$ is the maximum physical bandwidth available;
p is the number of said profiles, $1 \leq i \leq p$;
sp is the number of said subprofiles, $1 \leq j \leq sp$;
l(i,j) is a virtual circuit attached to subprofile j of profile i; and,
$B_{i,j}^k$ is the desired bandwidth of the $k^{th}$ virtual circuit in subprofile j of profile i.

6. An available bit rate scheduler for asynchronous transfer mode communication of a plurality of cells over a communication network characterized by a system clock frequency f and an allowed cell rate ACR, each of said cells characterized by a virtual circuit communication channel, each of said virtual circuits characterized by one or more profiles, said scheduler comprising:
  (a) a profile generator for iteratively generating a number p of said profiles by:
    (i) outputting a k*modulo $2^i$th one of said profiles during each kth iteration of said profile generator, where $1 \leq i \leq p$ and $1 \leq k \leq p-1$;
    (ii) outputting a null profile during each $2^p$th one of said iterations;
    (iii) dispatching said profiles from said profile generator to said a profile queue such that a particular profile is dispatched at a time $T=T_0+(1/ACR)*f$, where $T_0$ is the dispatch time of a profile dispatched immediately prior to said particular profile;
  (b) said profile queue coupled to said profile generator for receiving and sequentially storing said generated profiles; and,
  (c) a virtual circuit processor for sequentially receiving said profiles from said profile queue and, for each one of said received profiles, dispatching to an output queue all of said virtual circuits characterized by said one received profile.

7. An available bit rate scheduler as defined in claim 6, wherein said network is further characterized by a maximum allowable cell rate, and:
  (a) said profile generator generates said profiles at a rate μ times said maximum allowable cell rate; and,
  (b) said virtual circuit processor dispatches said virtual circuits to said output queue at a rate equal to 1/μ.

8. An available bit rate scheduler as defined in claim 6, wherein μ=2.

9. An available bit rate scheduler as defined in claim 6, wherein said profiles are further grouped into subprofiles, each of said subprofiles having a bandwidth allocation component $B_{i,j}^k$ of a total available bandwidth $\overline{B}_{i,j}^k = B_{i,j}^k/R$ where:

$$R = \frac{\sum_{i=1}^{p} \sum_{j=1}^{sp} \sum_{k=1}^{l(i,j)} B_{i,j}^k}{B_{max}}$$

$B_{max}$ is the maximum physical bandwidth available;
p is the number of said profiles, $1 \leq i \leq p$;
sp is the number of said subprofiles, $1 \leq j \leq sp$;
l(i,j) is a virtual circuit attached to subprofile j of profile i; and,
$B_{i,j}^k$ is the desired bandwidth of the $k^{th}$ virtual circuit in subprofile j of profile i.

10. A method of scheduling available bit rate cell transmission over an asynchronous transfer mode communication network characterized by a system clock frequency f and an allowed cell rate ACR, each of said cells characterized by a virtual circuit communication channel, each of said virtual circuits characterized by one or more profiles, said method comprising:
  (a) iteratively generating a number p of said profiles by:
    (i) outputting, during a kth one of said iterations, a k*modulo $2^i$th one of said profiles, wherein $1 \leq i \leq p$ and $1 \leq k \leq p-1$;
    (ii) outputting a null profile during each $2^p$th one of said iterations;
  (b) sequentially storing said generated profiles in a profile queue; and,
  (c) sequentially receiving said profiles from said profile queue and, for each one of said received profiles, dispatching to an output queue all of said virtual circuits characterized by said one received profile.

11. A method as defined in claim 10, wherein said profile generating step further comprises dispatching said profiles for sequential storage in said profile queue such that a particular profile is dispatched at a time $T=T_0+(1/ACR)*f$, where $T_0$ is the dispatch time of a profile dispatched immediately prior to said particular profile.

12. A method as defined in claim 11, wherein said network is further characterized by a maximum allowable cell rate, said profile generating step further comprises generating said profiles at a rate μ times said maximum allowable cell rate, and said output queue dispatching step further comprises dispatching said virtual circuits to said output queue at a rate equal to 1/μ.

13. A method as defined in claim 12, wherein μ=2.

14. A method as defined in claim 11, wherein said output queue dispatching step further comprises dispatching a null virtual circuit to said output queue if no virtual circuits are characterized by said one received profile.

15. A method as defined in claim 11, wherein each of said profiles may have one or more sub-profiles which further characterize said virtual circuits, and wherein said output queue dispatching step further comprises sequentially dispatching to said output queue all virtual circuits characterized by any sub-profiles of said one received profile.

16. A method as defined in claim 15, wherein said output queue comprises a plurality of time slots, with one time slot corresponding to each virtual circuit dispatched to said output queue and wherein said output queue dispatching step further comprises overlapping within said output queue a time slot corresponding to said one received profile and a time slot corresponding to a profile or sub-profiles immediately following said one received profile if no virtual circuits are characterized by said immediately following profile or sub-profiles.

17. A method as defined in claim 15, wherein said network is further characterized by a maximum allowable cell rate, said profile generating step further comprises generating said subprofiles at a rate $\mu$ times said maximum allowable cell rate, and said output queue dispatching step further comprises dispatching said virtual circuits to said output queue at a rate equal to $1/\mu$.

18. A method as defined in claim 17, wherein $\mu=2$.

19. A method of scheduling available bit rate cell transmission over an asynchronous transfer mode communication network characterized by a system clock frequency f and by a plurality of virtual circuit communication channels, each of said virtual circuits characterized by an allowed cell rate ACR expressed by mantissa and exponent portions, said virtual circuits further characterized by a next cell time and a current cell time, said method comprising:

(a) selecting those of said virtual circuits for which said ACR exponent portion is an exact power of two and grouping said selected virtual circuits into a set of p profiles, each of said profiles corresponding to one or more of said selected virtual circuits for which said ACR exponent portion is the same power of two;

(b) for each of said profiles, further grouping said selected virtual circuits into subprofiles, each of said subprofiles corresponding to one or more of said selected virtual circuits for which said ACR mantissa portions are linearly partitioned;

(c) for each one of said profiles:
 (i) if said one profile is non-zero and if one or more of said subprofiles are allocated to said one profile, then for each one of said subprofiles allocated to said one profile:
  (1) selecting a next highest one of said subprofiles allocated to said one profile;
  (2) determining said selected subprofile's next cell time;
  (3) if said selected subprofile's current cell time is greater than or equal to said selected subprofile's next cell time, then dispatching said selected subprofile to an output queue;
  (4) incrementing said next cell time by f/ACR;
 (ii) if none of said subprofiles allocated to said one profile have a current cell time greater than or equal to said subprofile's next cell time, then dispatching a null pointer to said output queue;
 (iii) incrementing said current cell time by an amount equal to the time required to process one of said subprofiles during said steps (c)(i)(1) through (c)(i)(4);
 (iv) if none of said subprofiles are allocated to said one profile, then:
  (1) dispatching a null pointer to said output queue;
  (2) incrementing said current cell time by an amount equal to the time required to process one of said subprofiles during said steps (c)(i)(1) through (c)(i)(4);
 (v) if said one profile is zero, then:
  (1) dispatching a null pointer to said output queue; and,
  (2) incrementing said current cell time by an amount equal to the time required to process one of said subprofiles during said steps (c)(i)(1) through (c)(i)(4).

* * * * *